(12) United States Patent
Chien

(10) Patent No.: US 9,838,652 B2
(45) Date of Patent: Dec. 5, 2017

(54) LIGHT DEVICE HAS BUILT-IN DIGITAL DATA SYSTEM FOR RECORD IMAGE, SOUND

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 15/453,270

(22) Filed: Mar. 8, 2017

(65) Prior Publication Data

US 2017/0244934 A1 Aug. 24, 2017

Related U.S. Application Data

(63) Continuation-in-part of application No. 14/728,369, filed on Jun. 2, 2015, which is a continuation-in-part
(Continued)

(51) Int. Cl.
*H04N 7/18* (2006.01)
*H04N 5/225* (2006.01)
(Continued)

(52) U.S. Cl.
CPC ............. *H04N 7/181* (2013.01); *F21S 8/035* (2013.01); *F21S 9/022* (2013.01); *F21V 21/08* (2013.01); *F21V 21/14* (2013.01); *F21V 23/04* (2013.01); *F21V 23/0407* (2013.01); *F21V 23/0464* (2013.01); *F21V 23/0471* (2013.01); *F21V 33/0052* (2013.01); *G06T 7/70* (2017.01); *H04N 5/2252* (2013.01); *H04N 5/2256* (2013.01); *H04N 5/23241* (2013.01); *H04N 5/247* (2013.01); *H04N 5/33* (2013.01); *H04N 5/77* (2013.01); *H04N 7/183* (2013.01); *H04N 7/188* (2013.01); *F21V 9/08* (2013.01);
(Continued)

(58) Field of Classification Search
USPC .................................................. 348/143–160
See application file for complete search history.

(56) References Cited

U.S. PATENT DOCUMENTS

2009/0290023 A1* 11/2009 Lefort .............. G08B 13/19608
348/151

* cited by examiner

*Primary Examiner* — Andy Rao
(74) *Attorney, Agent, or Firm* — Bacon & Thomas, PLLC

(57) ABSTRACT

A LED Light device having built-in camera unit is powered by AC or-and DC power source for a lamp-holder, LED bulb, flashlight, garden, entrance door light or other LED light device connected to power source by (1) prongs or (2) male-base has conductive wires can be inserted into a female-socket which connect with power source or (3) wired. The device has built-in camera unit has plurality functions to make different products and functions. The LED light device has at least one of (a) camera or DV to take minimum MP4 format image, (b) digital data memory kits or cloud storage station, (c) wireless kits, Bluetooth or USB set for download function, (d) motion/moving/other sensor, (e) assembly for contact Wifi, 3G/4G/5G network or even settle-lite channel, (f) system to transmit or-and receiving wireless signal, (g) APP or other platform software to operation related device, (h) LED lighting, (h) other electric or mechanical parts & accessories to get desired function(s) for the said LED light device. The said motion/moving sensor unit has desired part or all of digital data related module or circuit(s) or backup power and unit may in separated housing with light source assembly so people can upgrade the non-camera device to has built-in camera and digital device for their old non-camera security light.

23 Claims, 17 Drawing Sheets

Related U.S. Application Data of application No. 14/265,838, filed on Apr. 30, 2014, now Pat. No. 9,197,865, which is a continuation-in-part of application No. 13/295,301, filed on Nov. 14, 2011, now Pat. No. 8,760,514, application No. 15/453,270, which is a continuation-in-part of application No. 14/606,242, filed on Jan. 27, 2015, now Pat. No. 9,541,260, which is a continuation-in-part of application No. 13/367,758, filed on Feb. 7, 2012, now Pat. No. 8,967,831, which is a continuation-in-part of application No. 13/295,301, filed on Nov. 14, 2011, now Pat. No. 8,760,514, and a continuation-in-part of application No. 13/296,508, filed on Nov. 15, 2011, now Pat. No. 8,562,158, and a continuation-in-part of application No. 13/296,469, filed on Nov. 15, 2011, now Pat. No. 8,711,216, application No. 15/453,270, filed on Mar. 8, 2017, which is a continuation-in-part of application No. 15/390,783, filed on Dec. 27, 2016, and a continuation-in-part of application No. 15/268,125, filed on Sep. 16, 2016, and a continuation-in-part of application No. 14/863,553, filed on Sep. 24, 2015, which is a continuation-in-part of application No. 14/793,209, filed on Jul. 7, 2015, now Pat. No. 9,549,110, and a continuation-in-part of application No. 14/728,369, filed on Jun. 2, 2015.

(51) Int. Cl.
| | |
|---|---|
| *H04N 5/247* | (2006.01) |
| *H04N 5/232* | (2006.01) |
| *H04N 5/77* | (2006.01) |
| *F21V 33/00* | (2006.01) |
| *F21V 23/04* | (2006.01) |
| *F21S 9/02* | (2006.01) |
| *F21S 8/00* | (2006.01) |
| *F21V 21/08* | (2006.01) |
| *F21V 21/14* | (2006.01) |
| *H04N 5/33* | (2006.01) |
| *G06T 7/70* | (2017.01) |
| *F21Y 115/10* | (2016.01) |
| *F21V 9/08* | (2006.01) |
| *F21V 21/22* | (2006.01) |
| *F21V 21/30* | (2006.01) |
| *F21V 23/06* | (2006.01) |
| *F21W 121/00* | (2006.01) |

(52) U.S. Cl.
CPC ............... *F21V 21/22* (2013.01); *F21V 21/30* (2013.01); *F21V 23/0492* (2013.01); *F21V 23/06* (2013.01); *F21W 2121/00* (2013.01); *F21Y 2115/10* (2016.08); *G06T 2207/30232* (2013.01); *Y10S 362/80* (2013.01)

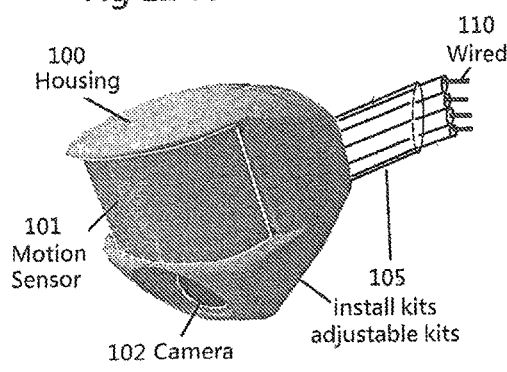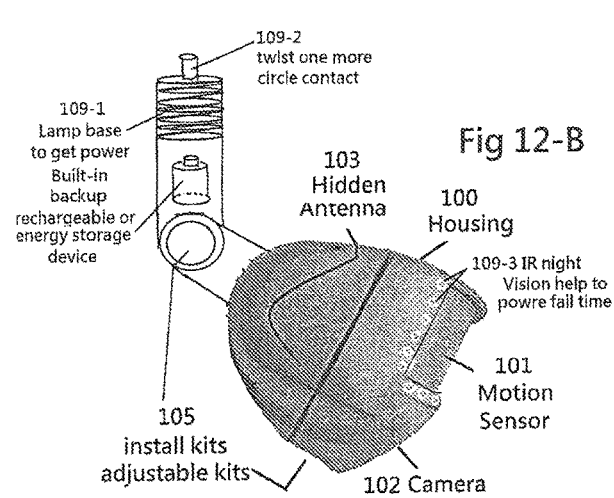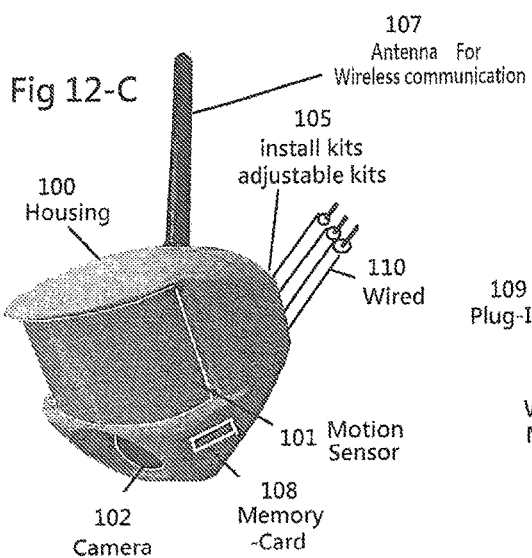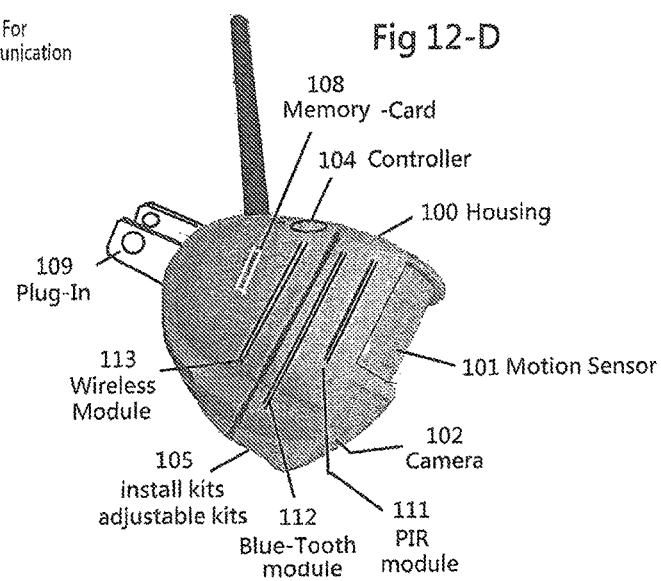

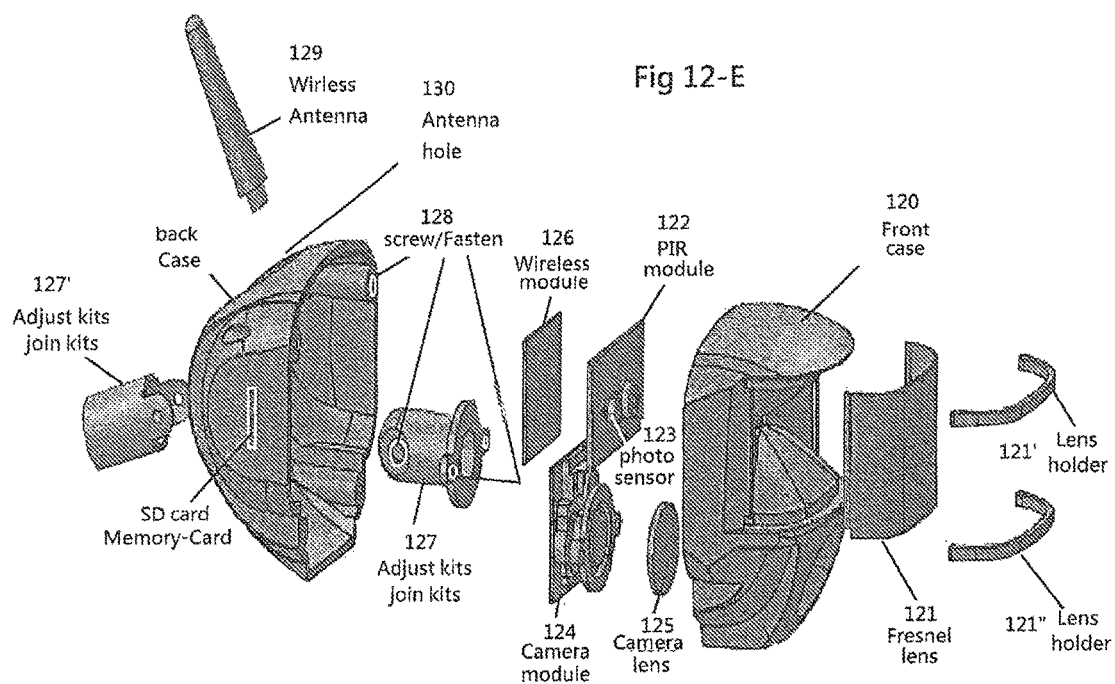
Fig 12-E

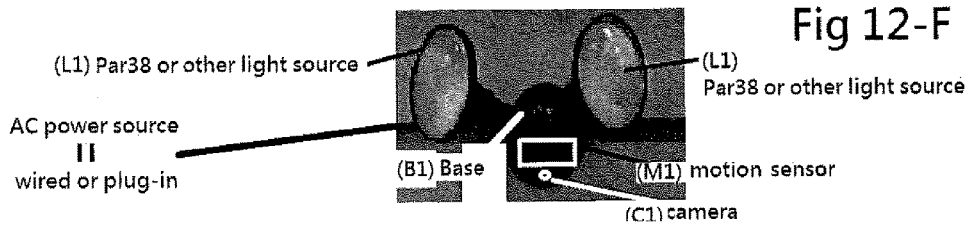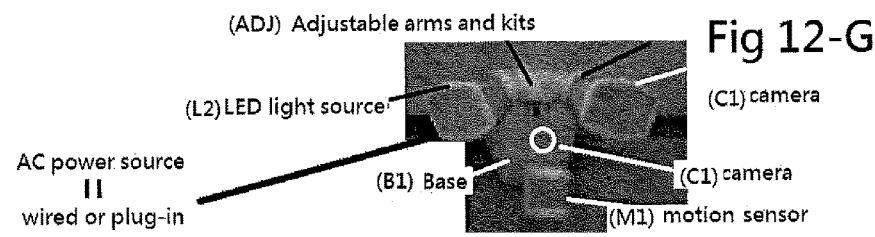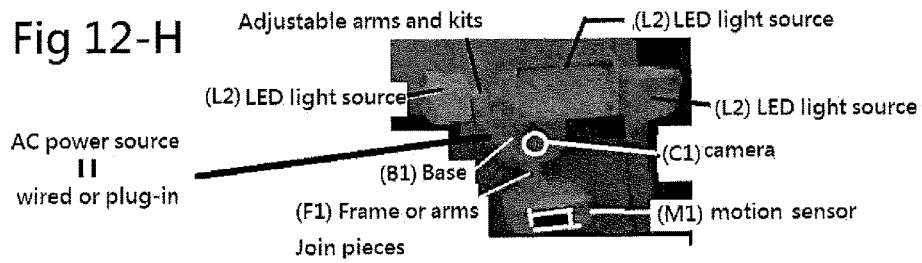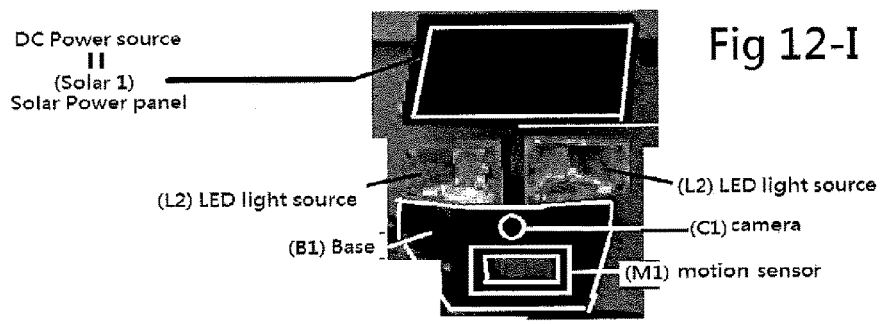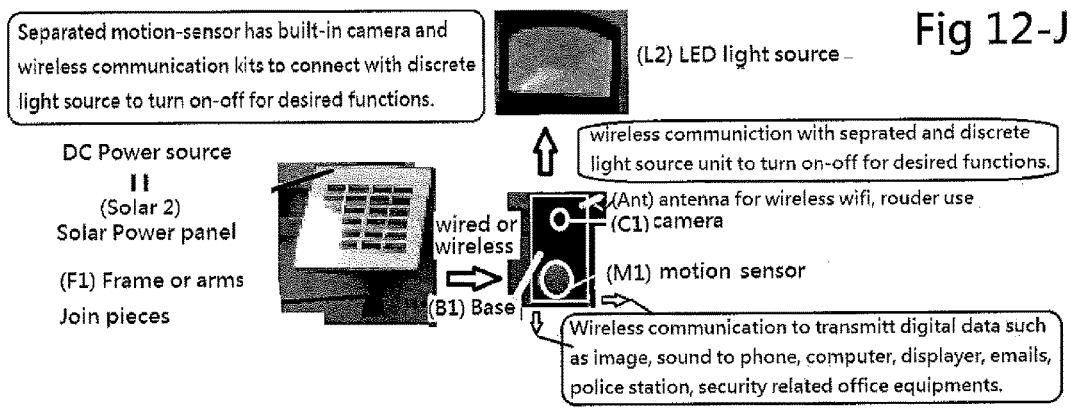

Fig 12-K
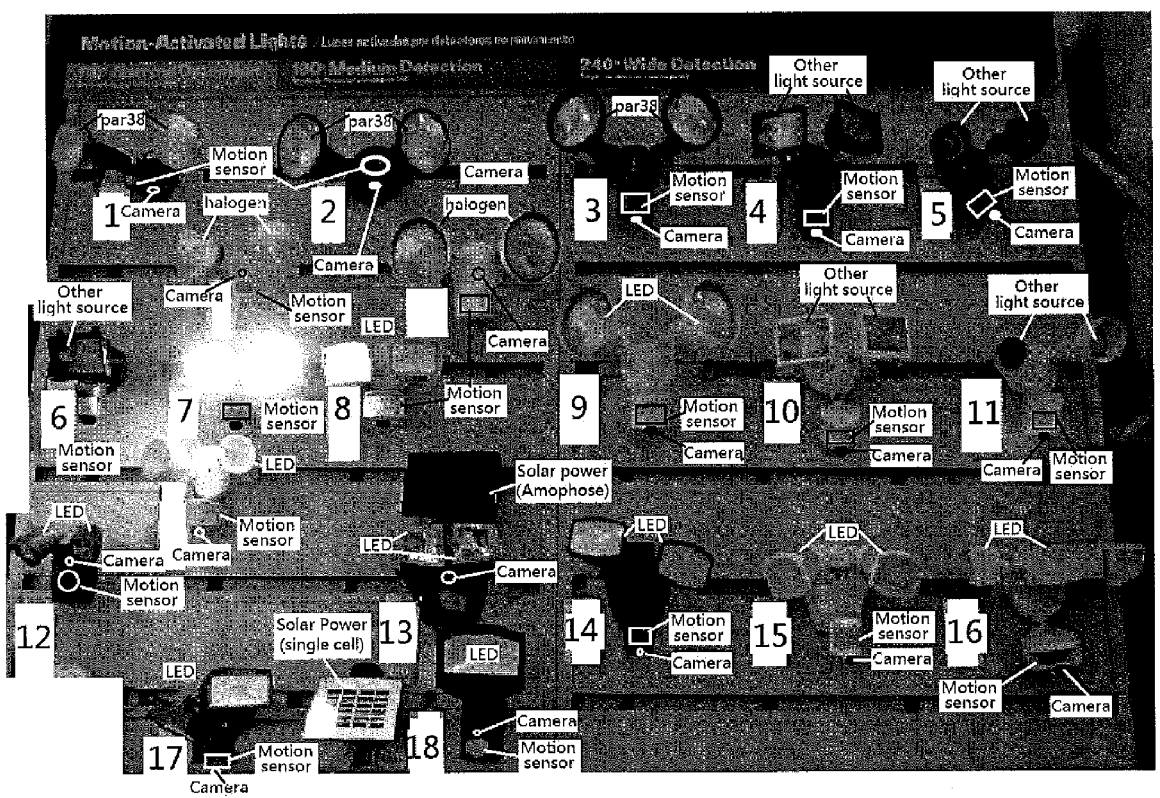

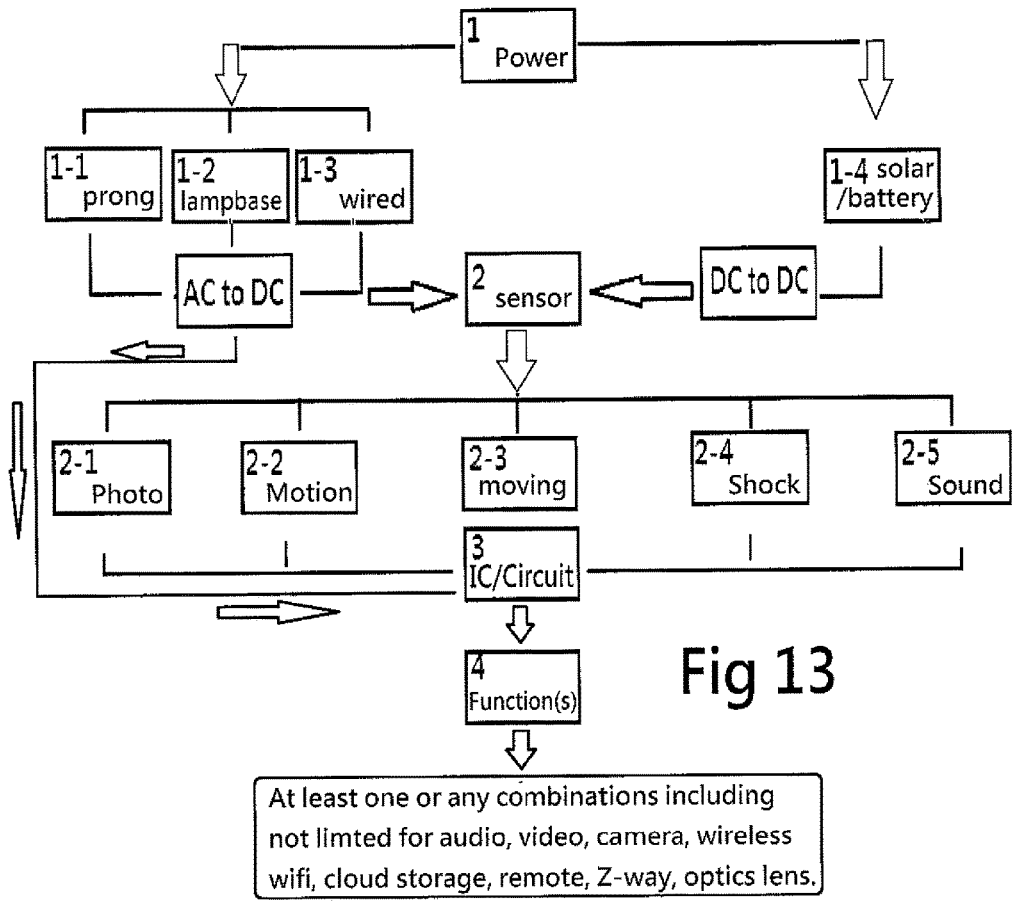
Fig 13
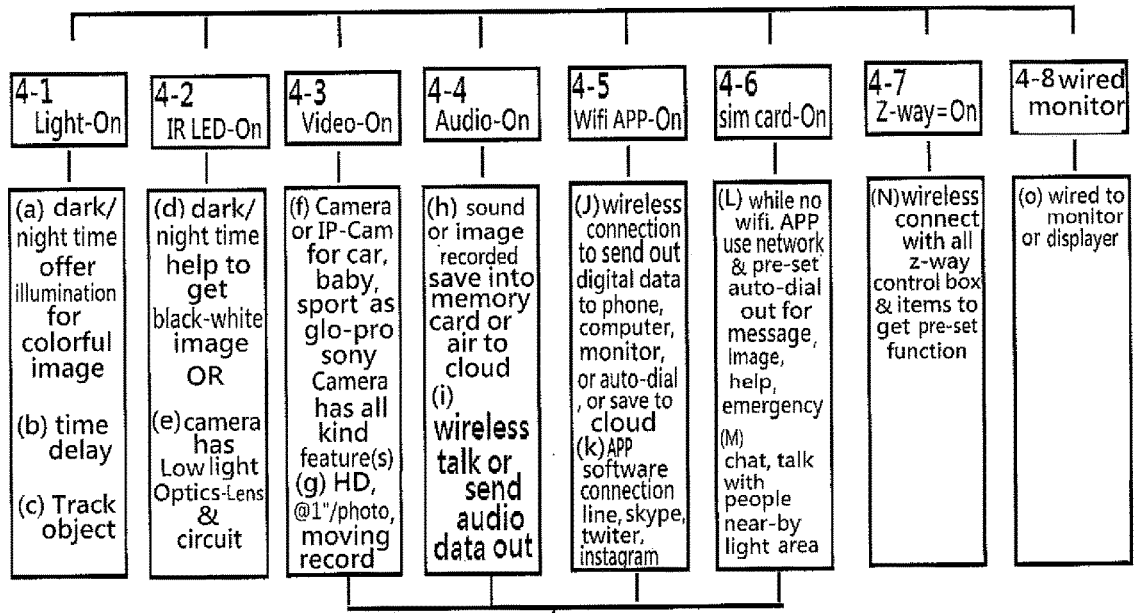

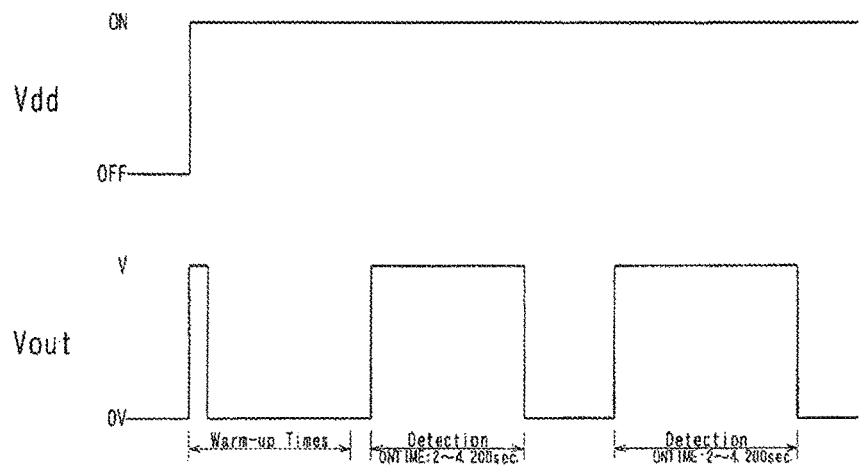
Cautions) Warm-up Time: Max. 30 sec.
Regarding of detection or non-detection during the waiting time, ON signal may be made due to instability of circuit
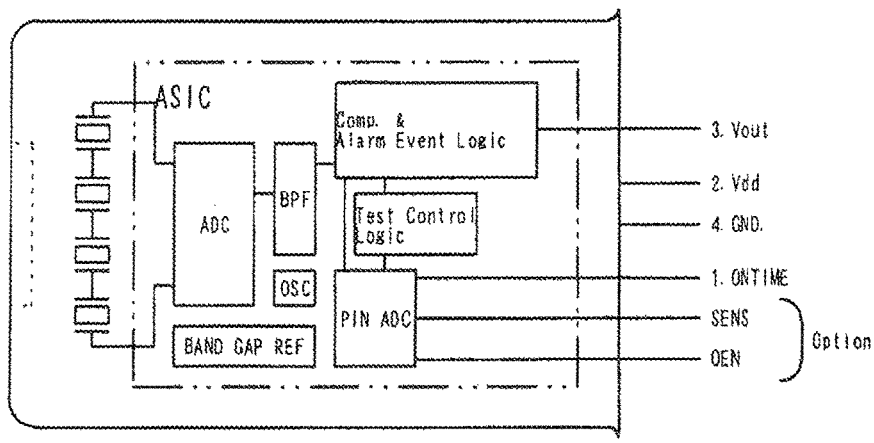
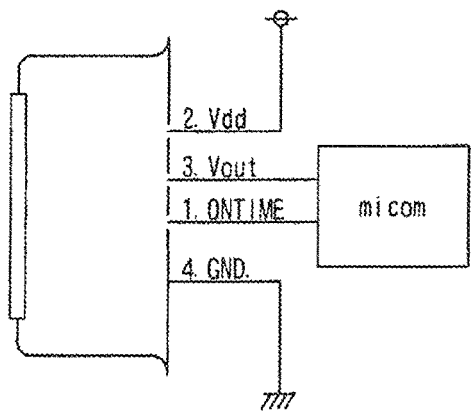
Fig 14

LIGHT DEVICE HAS BUILT-IN DIGITAL DATA SYSTEM FOR RECORD IMAGE, SOUND

RELATED U.S. PATENT DOCUMENTS

This application is continuation-in-part of (#KKK-4) U.S. patent Ser. No. 15/390,783 filed on Dec. 27, 2016 which is in continuation of application is continuation-in-part of (#KKK-8) U.S. patent Ser. No. 15/268,125 filed on Sep. 16, 2016 which is in continuation of application is continuation-in-part of (#KKK-7) which is continuation of this application is continuation-in-part of (#KKK-6) U.S. patent Ser. No. 14/863,553 filed on Sep. 24, 2015. This application is a continuation-in-part of (#KKK-5) U.S. patent application Ser. No. 14/793,209, filed Jun. 30 2015 now is U.S. Pat. No. 9,549,110 which is a continuation-in-part of This application is a continuation-in-part of (#KKK-3) U.S. patent application Ser. No. 14/728,369, filed Jun. 2 2015 which is a continuation-in-part of (#KKK-2) U.S. patent application Ser. No. 14/265,838, filed Apr. 30, 2014 now is U.S. Pat. No. 9,197,865, which is a continuation-in-part of (#KKK-1) U.S. patent application Ser. No. 14/265,738, filed Apr. 30, 2014 now is U.S. Pat. No. 9,560,322, which is a continuation-in-part of (#KKK-2011) U.S. patent application Ser. No. 13/295,301, filed Nov. 15, 2011 now U.S. Pat. No. 8,760,514, each of which is incorporated herein by reference. This application also is continue filing Of particular relevance are the (#KKK-11) inventor's U.S. patent application Ser. No. 13/295,301, filed on Nov. 11, 2011 (Now is U.S. Pat. No. 8,760,514 issued on Jun. 24 2014) and directed to a device having built-in digital data means and powered by an power source for a lamp holder, and This application is a continuation-in-part of inventor's (#JJJ-11) U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22 2013). Also This application is a continuation-in-part of particular relevance are the inventor's U.S. patent application Ser. No. 11/806,285 (#R) filed on Apr. 30 2007, which discloses an LED night light having multiple functions, and Ser. No. 12/951,501 (#ZZ-10) (Now U.S. Pat. No. 9,033,569 issued on May 19, 2015), which discloses a lamp holder having a built-in LED light.

This application is a continuation-in-part of U.S. patent application Ser. No. 14/728,369, filed Jun. 2, 2015 which is a continuation-in-part of U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. This application also is continue filing Of particular relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 (Now is U.S. Pat. No. 8,760,514 issued on Jun. 24, 2014) and directed to a device having built-in digital data means and powered by a power source for an LED Bulb (Now is U.S. Pat. No. 8,562,158 issued on Oct. 22, 2013). Also of particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015), which discloses a lamp holder having a built-in LED light.

BACKGROUND OF THE INVENTION

This application has subject matter in common with the inventor's U.S. patent application Ser. Nos. 12/624,621, 12/622,100, 12/318,471, 12/318,470, 12/318,473, 12/292, 153, 12/232,505, 12/232,035, 12/149,963, 12/149,964, 12/073,095, 12/073,889, 12/007,076, 12/003,691, 12/003, 809, 11/806,711, 11/806,285, 11/806,284, 11/566,322, 11/527,628, 11/527,629, 11/498,874, 12/545,992, 12/806, 711, 12/806,285, 12/806,284, 12/566,322, 12/527,628, 12/527,629, 12/527,631, 12/502,661, 11/498,881, 11/255, 981, 11/184,771, 11/152,063, 11/094,215, 11/092,742, 11/092,741, 11/094,215, 11/094,156. 11/094,155, 10/954, 189, 10/902,123, 10/883,719, 10/883,747, 10/341,519, 12/545,992, 12/292,580, 12/710,918, 12/624,621, 12/622, 000, 12/318,471, 12/318,470, 12/318,473, 12/292,153, 12/710,561, 12/710,918, 12/711,456, 12/771,003, and Ser. No. 12/951,501. Technical background and time table with document supported: This application also is continue filing Of particular relevance are the inventor's U.S. patent application Ser. No. 13/295,301, filed on Nov. 11, 2011 (Now is U.S. Pat. No. 8,760,514 issued on Jun. 24, 2014) and directed to a device having built-in digital data means and powered by an power source for a lamp holder, and inventor's U.S. patent application Ser. No. 13/296,508 also filed on Nov. 11, 2011 and directed to a device having built-in digital data means and powered by a power source for an LED Bulb (Now is U.S. Pat. No. 8,562,158 issued on Oct. 22, 2013). Also of particular relevance are the inventor's U.S. patent application Ser. No. 11/806,285 filed on Apr. 30, 2007, which discloses an LED night light having multiple functions, and Ser. No. 12/951,501 (Now U.S. Pat. No. 9,033,569 issued on May 19, 2015, which discloses a lamp holder having a built-in LED light. Home security products currently available in the marketplaces such as Lowes or Home Depot, especially wireless home security products, are expensive and overpriced, the current invention aims to reach out to multiple divisions of people's willingness and budget to spend money on home protection products; therefore, the current invention's functions are not limited to one combination but multiple combinations of different functions said below, differentiating on the budget of customers and the set combination of functions of the current invention.

The current invention involves an LED light, which may be in the form of a night light, bulb, lamp holder, or other light source or LED illumination device, and which has built-in digital device(s) of which, the current invention has built in digital device(s) with motion sensors, moving sensor, digital data recording, storage elements, wireless communications, cellular phone communications, smartphone applications communications, and display functions, of which, the current invention can transmit digital sounds, messages, photos, movies, films, audios, videos, recorded sounds, application notifications by update communication tools including 3G/4G/MP4 format file/wifi/cloud storage stations not like all prior art which use out of date JPEG, MPM or 2G or more narrow wireless transmission or even use Bluetooth which only good for small file to transmitting. etc.

The current invention has additional functions, however, but not limited to, such as living object (humans, animals) or objects (trees, leaves, rain, etc.) tracking ability, optional retractable prongs for flashlight also had such camera and wifi and cloud or SD card storage elements, and/or lamp-base installments, optional/add-on night-vision ability for dark area/late hours' usage; all additional functions aims to enhance user's experience when operating and the guarantee the reliability of the current invention.

The current invention aims to enhance the user's safety measures by providing high resolution (such as Full HD colorful image), real-time photos (Through MP4 format digtal file+ wifi or 4G or 5G internet+ cloud/or servers storage station), videos, and/or streams of a designated area of the user's choice which is not available before 2009 basing on 4G mobile phone came out and all wireless station well established national wide.

When using streams, the current invention will use its Wi-Fi and/or Bluetooth function to connect to users' home network or cellphones and/or smartphones and be able to stream through cellphones or smartphones applications for users' viewing purposes again this need depend on update internet upgrade to 3G to 5G, Phone has 4G or up communication capability, or even has better and faster server or cloud storage stations.

The current invention also carries the ability to store videos and pictures, under the conventional formats which are used in modern times such as MP4, MPEG 1 to 4, AVI, GIF, WMV, AMV, JPEG, etc.

The means of the storage of this current invention includes but not limited to: conventional and common storage cards such as SD cards, TF cards, cloud storage services such as iCloud, Dropbox, Google clouds, USB drives. The stored videos or pictures can also, but not always have to, feature in 30 frames per seconds, 60 frames per seconds or other combinations of video related elements however, these update digital file MP4 format incorporated wifi and servers or/cloud storage for stream transmission is not happen and exist before 2009 further more the market has no any mobile phone such as 3G or 4G with national wide has all base stations well installed before 2009.

The current invention can also take pictures through applications' commands under the resolutions (such as Full HD) which is capable to have pictures taken at the conventional and common resolutions in modern times. The current invention's power input comes from either prongs or wired or optional retractable prongs or lamp-holder bases, or conventional batteries (preferred rechargeable) which serves as backup sources.

The current invention may also consist of similar or equal function or alternative functions device such as compact Digital Video (referred as DV) device such as webcam, driving camera, IP camera, and/or GoPro, which can be built into the light device to simple to make a current invention products. Preferably, the camera has lenses in a small-form-factor for hidden purposes, so the camera can easily be built-into the light device while remain incognito. The invention aims to use lower cost, however efficient camera devices, to avoid problems which requires technicians to investigate troubles the device might cause.

The camera will send digital data to the said display units while receiving power directly from a power source including AC or DC or backup power source as said above. Then depending on the functions, the current invention can link to Wi-Fi or Bluetooth or 3G/4G even current new 5G station or other networks and send notifications through applications (APP or equivalent software) to any smartphones, text messages or warning calls to cellular phones, pictures, videos, recorded sounds, or live stream in different file format can also be sent through Wi-Fi to said smart phones however only if the smart phones have internet services of 4G or update 5G net work, or any other modern internet services.

The said internet services a cellular device, smart phone device, tablet device,

| Generation | Speed | Technology | Features |
|---|---|---|---|
| 2G | 9.6/14.4 kbps | TDMA, CDMA | 2G capabilities are achieved by allowing multiple users on a single channel via multiplexing. 2G enabled mobile phones can be used for data along with voice communication. |
| 3G | 3.1 Mbps (peak) 500-700 Kbps | CDMA 2000 (1XRTT, EVDO) UMTS, EDGE | 3G provides amazing internet browsing speeds. Opens the door to a whole bag of opportunities with video calling, video streaming, etc. In 3G, universal access ad portability across different device types are made possible. (Telephone & PDA's) |
| 3.5G | 14.4 Mbps (peak) 1-3 Mbps | HSPA | 3.5G supports even higher speeds and enhances higher data needs. |
| 4G | 100-300 Mbps (peak) 3-5 Mbps | WiMAX LTE | Speeds for 4G are increased to lightning fast in order to keep up with data access demand used by various services. It also supports HD streaming. HD phones can be fully utilized on a 4G network. | computer, laptop, or any other computing devices which consist data-transmitting function must have said 3G, 4G, or any other modern internet servicing speed in order for the current device to transmit large or small amount of data to the above said devices. The first 3G network were introduced in 1998 and the fourth generation (4G). (apekshatelecom.com)

It is inarguably that the first globalizing time when 3G network starts to be generalized is when iPhone 3G came out on Jul. 11, 2008. (iPhone 3G, Wikipedia) Ever since the release of the mainstream phone iPhone 3G, the 3G networks started to publicized until the very modern days. It is correct to say that any patents before the release of iPhone 3G and the generalization of 3G networks of similar ideas differs from my invention is because the ability to transmit high-volume data of pictures or video, or even to stream live feeds cannot be done due to the lack of technology before the development of the 3G network.

It is inarguably that the first globalizing time of 4G or LTE network starts to be generalized is when in 2008 the International Telecommunications Union-Radio communications sector (ITU-R) specified the standards of 4G or LTE which must reach at least 100 megabits per seconds, this internet servicing speed is aimed for high speed, mobile telecommunications for variety of purposes. (4G, Wikipedia) The current invention utilizes 4G technology, and aims to use any modern network services succeeding 4G speed to send out valuable security information of customer's home protected, pre-determined area to any mobile devices. The said information sent to customers contains any but not limited to the followings: digital sounds, messages, photos, movies, films, audios, videos, recorded sounds, application notifications, etc. The very first smart phone to carry out the 4G capability was the HTC Max 4G, which was pressed released on Nov. 12, 2008. This date sets the very first date that the current invention's 3G and 4G LTE transmit function.

It is inarguably that the current invention is first of its kind to have the function to store any digital information taken by the camera inside cloud services such as iCloud, Dropbox, Google clouds. The introduction of cloud computing began early 2000, however, this specific function started to generalize first by Amazon on October 2008, then by Windows, Rackspace Hosting and Nasa, IBM, and Oracle on the years between 2010 and 2012. (Cloud Computing, Wikipedia) The previous related patents before the year of 2008 are considered irrelevant in words of cloud storage means to the current invention.

The current invention may also consists ability to store the said digital data in a SD card, TF card, USB flash drive, cloud services such as iCloud, Dropbox, Google clouds, or any other digital data servers. For SD cards, TF cards and/or USB flash drives, the current invention aims to reach an easy plug-and-go form factor for simple downloading any stored photos, videos, recorded sounds, etc. to any electrical equipment any customer has on his or her possession.

The cloud services depend on the customers' preferences. There are multiple cloud services around the world that are free of charge (e.g. DropBox, iCloud, Google Cloud, etc.), or charge depending on the total size of the cloud. The current invention will have an option for customers to, instead of using a SD card, TF card, USB drive, or other hardware storage units, link to a cloud storage and store all taken digital sounds, messages, photos, movies, films, audios, videos, recorded sounds, application notifications, etc. for future references. The cloud can also be non-online clouds called Network Attached Storage (NAS) such as using a server cloud right in the possession of the home owner who uses the current invention, meaning, the usage of multiple Terabytes (TB) HDD and the formation of a server using other products from brands like Synology.

The said digital sounds, messages, photos, movies, films, audios, videos, recorded sounds can be in forms of any kind that are generally and commonly used in modern days, such as file format of AVI, FLV, WMV, MOV, MP4, etc. for video related formats; JPEG, TIFF, BMP, raw image format, BIT, etc. for picture related format. These are only inclusions but not limited to the above noted formats, any modern file format is included even if not listed.

Even though Wi-Fi came as early as 1999, the generalization began when the common people started using mobile smartphones to link themselves to the internet without overpaying the cellphone company. The inclusion of Wi-Fi in the current invention only uses Wi-Fi as a bridge for connectivity for Clouds, mobile alerts and streams for cellular and smart phones.

The said motion sensors of the current invention include all kind but not limited to below: Passive Infrared Sensor (Shorted for PIR), Ultrasonic Sensor, Microwave sensor, Tomographic sensor, or any of its combination. The usage of each kind of sensors depends on the customers' budgets and how much likely hood of false alarms a design will want to decrease. Some motion detector might be included in IC in pair of a camera lens, which detects movement between two periods of time so the camera or other designated device will active as soon movement is scanned. Each and the modern said motion sensors are included in the current invention.

(www.elprocus.com)

Current home security products available in the marketplace, and especially wireless home security products, are very expensive. Furthermore, not only are they too costly, they are also too much trouble to install (may need engineer to help) and some application need use outside control box with complicated setting which is not easily for youth or aged peoples. the batteries or power storage means must be replaced very often.

However, market required for easily install and short time installation, so the current invention also apply the camera digital device for battery powered unit.

Compare with all below listed US Prior arts, The current invention had update technical and has more faster to wire transmission the MP4 format digital data to shown or to other display device.

(1) US prior art U.S. Pat. No. 8,926,139 and U.S. Pat. No. 8,872,964.
  (1) The Reed '964 disclosure the outdoor lighting which has imager to take image and though the process to get the electromagnetic spectrum to determine the light device function (FIG. 2A, FIG. 2B, FIG. 2C).
  (2) The Reed '139 same as the '964 the imager took image $1^{st}$ and become electromagnetic spectrum so make decision for light functions. (column 3 line 54 to line 62). Also, the camera is take for period of time is not like the current invention light turn on $1^{st}$ and camera do the work accordingly. Also, Current invention never want to see spectrum which is only good for military or war filed, Current invention need a full color image so can make identification for person or lived objects.
  (3) Compare with current invention the LED light is turn on $1^{st}$ so can offer the enough brightness to the camera to take colorful and clear picture or video and preferred combine other added functions or circuitry. This is totally different for Imager operation and final storage or show the electromagnetic spectrum v.s. full color image with sound of current invention.
(01) Also, U.S. Pat. Nos. 8,926,139 and 8,872,964 patented to Reed et, al. discloses an outdoor lighting device which has image taker to take images through process of electromagnetic spectrum to determine the light device functions (FIG. 2A, FIG. 2B, FIG. 2C). The invention Reed et, al. discloses takes pictures first then go through the electromagnetic spectrum to determine the light functions, unlike my invention, our devices' lights go out first, then the devices take pictures to ensure the natural colour of the predetermined shape is stored inside the storage means mentioned above. Also, as above mentioned, the current invention doesn't require the usage of electromagnetic spectrum which is preferably used in higher-technical situations such as battlefields or any other security space which cost expensively, my invention aims to fit budget for each customers. The current invention lights up first so the camera can then take the full natural color images, videos, or other data in the most vivid way possible, when everything is lightened up.
(2) US Prior arts US Filing series No. 2003 021 0340 which show the camera device is connect with bulb lamp-holder to get power which is totally not same as the current invention including:
  (1) current invention to use LED or LEDs has desired number of own housing and each LED or LEDs inside own housing is direct connect with the light device circuitry so NO ANY LAMP HOLDER NEEDED for LED or LEDs light source production.
  (2) The '0340 Romannowich prior art teach the camera connect with lamp holder will be rusted very short time so the camera device will become no function because lamp holder normally is too easily rust while put outdoor applications.
  (3) The current invention has desired number of housing for LED or LEDs light source which depend on what brightness and how high the raised temperature will created so can make light source housing number from 1 to N (any number) and each LED or LEDs housing is directly connect with main circuitry so can prevent from any one of N (any number) light source or the wires or functions is out of order and not totally loose functions.

(4) The current invention most important the Camera assembly is connect with the main circuitry directly not connect with lamp holder (Because LED or LEDs light source no need lamp holder at all).

(5) The current invention also teached the most important design the said camera with or without built-in slot for the memory kits including but not limited for the SD card or Mini-SD card which can be take days for picture or video and with optional over-write function so the memory kits can last for years without need to change at all. This is other features which teached by current invention for memory kits main function. Current invention has the built-in memory kits as basic model which has no other added wireless or wired display function for cost consideration so can let all consumers to buy this low cost unit. Which '0340 Romanowich is not teached this most important built-in memory kits such as SD or Mini-SD card for most important features. All wired or wireless to present image or digital data is a luxury options for current invention.

So, this is different with the construction and functions and application for the camera apply for any light device.

Also, US Prior number 20030210340 by Frederick Romanowich explained a design of camera combined with a bulb socket with a lighting bulb. The current invention does not limit itself to bulb bases or sockets, however, bulb sockets are one way to provide illumination for LED lights. The LED in my design is directly connected to the light device circuitry and no help should a lamp holder provide in order for the lighting to take place. The other main difference between the two patents are the usage of storage means. The current invention consists the usage of SD cards, TF cards, and/or USB drives, however, Romanowich did not mention the usage of any of them. The difference is clear on how my design will fit any kind of budget a customer is willing to pay, because my design gives variety of combination for each level of security my design can possible provide.

(4) prior arts U.S. Pat. No. 2,007,001 3513 which teached the street light which is not same as current invention (1) Light source is 175 Watt Mercury Vapor light source which is totally different with current invention for LED light source (2) The '3513 use the Photo sensor to make the on-Off light which is different with current invention for the motion or moving sensor (3) The wireless communication system of '3513 is though the cellar phone net work system to send out wireless to near-by station and then, send to the generation station and pass to other station to the monitor team which is not same as current is connect with housing or resident wifi system. So '3513 is for outdoor internet and current invention is through the house or residence system which is different. So this is not any relation for current invention.

also, US Prior number 20070013513 by Tang et al. described an invention in street-light fashion which is not similar to the current invention. The other differences are the invention by Tang et al. utilizes 175 Watt Mercury Vapor light source; on the other hand, the current invention utilizes LED light sources. The patent by Tang et al. uses photo sensor to make on-off light which is not the same as the current invention which uses motion sensor. The patent by Tang et al. uses cellular phone network to transmit data from wireless station then to a general station monitor team then to the cellphone, which is not similar to the current invention which utilizes 4G or above internet services, Wi-Fi networks, Bluetooth network, streaming services, or all other mentioned "wireless" methods to transmit the said digital data to cellular phones or smartphones directly from the device.

(5) Prior arts U.S. Pat. No. 7,455,435 Mattew is teach a data delivery channel by the house lighting device wires to make the digital data delivery like fiber optics theory but different carriers which is one of the digital data delivery like wife or internet . . . Mattew did teached the data delivery and receiver majority for the audio device for speaker or amplifier. Nothing to do with the any image or camera and relation for LED light and Camera with memory kit so this is not any relation with current invention.

Also, Prior number 7455435 by Mathews et al. described a design consisting a speaker, which is not included in current invention. Mathews et al. limited his/her invention to transmission only through AC power line through a standard bulb socket, while the current invention aims to transmit digital sounds, messages, photos, movies, films, audios, videos, recorded sounds, application notifications, etc. through 4G or modern internet services, Wi-Fi, Bluetooth, storage means such as SD cards, TF cards, and/or USB flash drives, or notifications to smart phones, texts to cellular phones, streaming to phones or other display units such as flat screen TV, Amazon, Google, Apple TV or its equivalent. According to Mathews et al., his or her invention does not include a camera device to capture real-time image or picture in order, for security reasons, to show them to authorities or for other purposes, therefore this patent has no similarity to the current invention.

(5) Prior art U.S. Pat. No. 6,686,952 Brazier teached the pedestal assembly light device which has rotating construction with plurality of motion sensor detector for moving objects. The built-in removable light source has light socket and camera built top of the rotatable base. Brazier is different with current invention for (1) Brazier teach is outdoor pedestal construction which is too far away for wall surface and too difficult to install on the wall need some solid support or metal bracket (2) light source is removable and has light socket to install so this is not the LED or LEDs light source has its own housing without any removable or light socket to install or replace.

(3) The Brazier has no any memory kits or the slot to install the said memory kits including but not limited for SD card or Min-SD card so can save the image or sound into with optional days recording capacity or even years while has over-write capability.

(6) All the current invention installation the light device base is parallel to install on the wall which is not belong to any pedestal construction which is like become light construction and application.

so can take out from built-in memory kits while had any bad things happened for house, residence, building, office, outdoor. So the difference for light source, memory kits, narrow camera shooting angle, motor-gear set, pedestal body is totally different with current invention.

(6) US prior art U.S. Pat. No. 2,004,021 2678 Cooper teach a system which has the
   (1) $1^{st}$ low-resolution image sensor to take $1^{st}$ image of a scene and go through the controller for determine where motion has occurred based on images captured by the sensor. This is difference than the current invention $1^{st}$ is turn on-off light device and then camera take picture or photos under pre-determined functions which has no $1^{st}$ sensor and wait for controller searching is meet controller definition then go to take a high resolution image.
   (2) The Cooper unit is battery Powered which is different with the current invention for variety of power and even current invention use Battery power still have back-up battery for continue supply current.
   (3) The current invention no need 2 different resolution image sensor or
      Camera to make 2 steps with the complicated program design which may not meet all kind of people wanted. Current invention just take camera because has built-in memory kits which for days or years memory kits including but not limited of SD card or mini-SD card with or without over-write functions to make days or years difference.
   →So the Cooper items is too costly for 2 image sensor or camera+complication program design for controller which not let all People accepted satisfactory+lack of economical SD card or Mini-SD card to make low end cost LED light device has the camera and Took clear photos or video for police to check if had bad things happened.
   Also, US Prior number 20040212678 by Cooper et al. described a low-quality image capture device that is not the same as the current invention due to the process of taking digital sounds, messages, photos, movies, films, audios, videos, recorded sounds. The Cooper et al. invention takes pictures and then transmits the pictures into a control unit to determine motion; while the current invention provides lights and then capture pictures for natural quality and colour. The Cooper et al. invention is also only battery operated, while the current invention relies on the AC through DC power input from different sources listed above, however, batteries can still operate as a backup power source for the current invention but not limited to this ability. The Cooper et al. invention also has two mode switching between sleep and normal; the current invention does not require such complicated programming, not only because it will increase the possible cost, but also not necessary as power for current invention is not to be considered about because the current invention will have unlimited power as it is plugged in varies of ways into a direct power source.
(7) US prior U.S. Pat. No. 5,107,120 (89F=PIR head and sensing range design)
   Tom U.S. Pat. No. 5,107,120 which is out of date PIR design. The current invention only use 1 single PIR can cover the 30 to 270 degree range. So this is not able compare with current invention.
   ⇒Claim 40 had add the (Single PIR) motion sensor.
   Also, U.S. Pat. No. 5,107,120 by Tom described an invention of passive infrared detecting device which uses different methods than the current invention to reach up to 180 degrees' field of view, however, the current invention includes a Fresnel design and single PIR to reach the field of view of 270 degrees.
(8) US prior U.S. Pat. No. 5,946,404 (98F=For School Bus use)
   Bakshi device for school bus use→This is not same as the current invention for the home or hand carry products→So this is not compartable at all. Also, the Wifi Definition came out on 1997 for 2.4G 2M which there had no any device came out from market at all so it has out of date for the Wifi or internet can transmitting big size of the full color digital data at that ancient time.
   Also, U.S. Pat. No. 5,946,404 by Bakshi et al. described an invention consisting a transparent glass and a dummy camera with video and audio recording ability, this is different from the current invention due to the current invention does not include a transparent glass, the current invention has a Fresnel included in front of the motion detector to reach maximum 270 degrees. The Bakshi et al. invention uses the glass to further protect the camera and microphone included, the current invention uses the Fresnel to provide better motion detection for the device.
(9) US prior U.S. Pat. No. 6,100,803 (99F=Ceiling Light fixture with Motion sensor unit)
   Chang device for the Lighting fixture base had built-in motion sensor set to turn on Bulb and the light device has one electric connector 13 for directly electrically connecting with a comoon bulb socket. (Colume 2 line 38 to 40) so the power is get from the Bulb socket AC current. Which is not same as current invention power source which is not from the Bulb socket (13).
   Chang also lack of any Camera mean. Chang filed on 1999 and at that time no any wifi or big or wider channel band can send out the full color HD colorful image though the any wireless network so Chang device is not compartable with current invention.
   Also, U.S. Pat. No. 6,100,803 by Chang described an infrared warning detector consisting at least two of each lights and detector. The Chang's invention does not include a camera mean as the current invention does, and the Chang's invention has no digital transmission means as the current invention does. Chang's invention also consist bulb socket AC powered light device, which the current invention does not limited the power source to. Chang's invention has different purpose which is to illuminate the surrounding and provide sound alerts to remote areas, the current invention aims to store any digital information and data in order to provide safety for the designated areas of the customers' choices.
(10) US prior U.S. Pat. No. 7,321,783 (03F=internet or wireless for mobile not Wifi at home)
   Kim teach a mobile entertainment and commination device on Nov. 20, 2003 which for palm-held size housing has a cellular or satellite telephone capable of wireless communication with the internet. This is not the Permanent installation for current invention for home installation or hand-carry flashlight device.
   Kim device also built-in display screen and speaker and earphone, those all for phone construction, so no compatable with current motion sensor security light device.
   Also, U.S. Pat. No. 7,321,783 by Kim introduced a palm-sized, cellular phone-like device which is able to transmit digital data and record sound and take pictures in an ambiguous measurement of distance. This patent was allowed on Nov. 20, 2003, which 3G, 4G and Wi-Fi has not yet been introduced publicly like in the modern days, so the methods of transmitting the digital data are different. Kim's design differs from the current invention also, when the current invention uses illuminations to capture nature colour images, but Kim's design does not include any illumination (flash lights, LEDs, etc.) Lastly and furthermore, Kim's designed his or her invention on the purpose of entertainment, for recording musicals, the current invention was designed for area security which have the same bases but different purposes.

(11) US prior U.S. Pat. No. 8,461,991 (10F=plurality of adjacent sector for fresnels+ reflector for light source)

Botha device for multiple PIR sensor head with multiple Fresnel windows to sensor the moving objects and through the Circuit to make the said top Light device to emit the light because the 2010 filed by the Botha used old and out of date the PIR sensor which only can cover small area from FIG. 3 seems only 90 degree so Botha need use a movable mechanical to change the PIR head to different directions to check the desired wider area (180 degree) and whenever the PIR change to different direction, The front Fresnel lens also need to change position to match inner PIR sensor head, so need multiple window surrounding the 180 degree and use many Fresnel lens . . . .→This is different with current invention only use ONLY ONE PIR sensor head which can cover from 30 up to 270 degree. The current invention had update for PIR sensor head so no need the so expensive mechanical to make moving or rotating for PIR and need a lot of Fresnel lens through a lot of window.→so this is not compartable with current invention for 2 different technical Botha is Out of date ancient device and current invention had update good PIR so no need motor, no need moving PIR head No need a lot of Fresnel lens and Fresnel window.

Botha also lack of Camera and Wifi and Movable SD card and download device to wireless transmitting concept at all.

Also, U.S. Pat. No. 8,461,991 by Botha described a security light device which includes a motor to turn the light source for better tracking and on-spot illumination. This is different with the current invention because the current invention has advanced optical Fresnel technology to reach maximum of 270 degrees in order for the motion detector to search the surrounding for possible hostile situations. Additionally, the Botha invention does not include any storage means or transmission means such as SD cards, etc. and 4G, Wi-Fi etc. which are mentioned above and included in this current invention. Therefore, the Botha invention and current invention are not the same.

(12) US prior US2003-019-7807 (Camera adaptor has bulb socket to receiving existing Bulb)

Wu item one camera (110) built-into adaptor (102) which can receiving-end (106) the separated existing bulb (108) and other end has male bulb screw base (104) and top had front door lantern housing. The Wu products as (0010) Line 6 to line 9, the system can also include a display device connected to the network transceiver to accept and display the digital image information-.→This means the wireless communication is too big size at that old time date maybe the format still at .AV or other old time date which too big to send old time network so from Wu's (network power line modem 220) on FIG. 4, 5, 6, 7 need the (Modem 220) to help go get the image.

However, the current invention transmitting the digital data by MP4 or more advanced technical for image format and transmitting by wife or more advanced channels than Wu's old time technical→From electric technical the MP4 or higher image format definition start from 2001 for 1$^{st}$ phase and current invention use at least MP4 for more high technical and use Wifi to delivery so it only short time can receive the digital data and no need the (connect AC outlet to get AC power for network powerline modem 220).

Back to Camera installation. The Wu application use out of date camera so has narrow range so need to adjust the camera direction while the camera installed on the rotating or adaptor.

→This is different with current invention the said LED light unit or/and camera is semi-Permanently after first time install on location no need rotating because use wide angle PIR motion sensor and camera assembly.

→The current invention has digital data had min. MP4 or equivalent format so can use wifi to transmitting small file→Not like Wu's need through the (220 Network powerline modem) to get the image.

Also, US Prior number 20030197807 by Wu described a bulb base camera design which uses the bulb socket for AC current which can also use batteries and replenish the batteries. Wu's design also uses a flexible arm in order for the camera and internet computing device to fit into any screw-in bulb bases and to cover the desired area to carry out the design's function, this is different from the current invention as the current invention uses an advanced Fresnel design to reach maximum of 270 degrees of coverage in the front plane of the camera unit, so the current design do not require a manual-flexing arm for the camera to work properly. Wu's design also differs from the current invention as there is no 1) storage means for stored images and videos such as SD cards, TF cards, Cloud storages connectivity, USB drives 2) network notification means to cellular/smart phones for alerts and streams using at least 4G or modern internet services or Wi-Fi or Bluetooth 3) other power source means such as prongs/wires. Therefore, there are numerous technical updates since the written date of Wu's patent compared to the current invention, the two designs are different.

(13) US prior US2005-008-5131 (03F=Existing electric device 1 add one adaptor 2 which has bulb base or prongs Sutherland product is make a new Screw base to fit the existing electric appliance into (See FIG. 1) and connect all the exisiting appliance power wires or controller (FIG. 2 and FIG. 3) with the said new screw base.

From FIG. 4 and FIG. 5 show the how to design a new screw base or prong base.→so this prior art do not had any similar from construction, camera, image, LED light and further for the digital data, wifi wireless transmitting, storage device SD card or display or reply With current invention.

Also, US Prior number 20050085131 by Sutherland described a lighting fixture that connects to a junction box. This is totally different from the current invention as the current invention can be placed anywhere desired with simple installation. Sutherland's design also does not include a camera unit, wireless transmitting digital data unit, storage units, which are the main functions of the current invention. Therefore, the two designs are not similar at all.

(14) US prior 2007-025-7195 (07F=has many non-adjustable detector & camera to combine one monitor system Reibel products show is security system has (1) controller to communicate with security-monitoring device. The monitoring device and controller is separate units and away from each other form FIG. 1 and also connect with all other peripheral communications.→This is not same as any one of current invention claims for (1) Security light has everything inside housing (2) Individual Motion sensor-unit (3) camera assembly for each item can take at least MP4 format image, sound, audio and use wifi to transmitting out digital data and let receiver device can instantly to see or review or display or print out.

Reibel also has no any light device to help the monitoring device to have sufficient brightness to take a full color at least MP4 format color image to easily and instantly send to receiver to see at once.

(15) US Prior 2008-015-1050 (07F=Motion take camera and send to computer center to Mobile=No light
  Self device have to work with Computer to make the capture image into JPEG format for the still image, or use computer to make captured video into MPEG or MPEG2 format to wire transfer (0029) and (Claims) →This is not same as current to take image at least has MP4 format and can instantly directly wireless transmitting by wifi and also send by APP software including skype, line, wechat, what'sAPP, twiter, Instagram to mobile phone to review or display or printing.
  Self also did not show and discuss for any of LED light device to help the camera assembly to take full color at least MP4 format digital data under low or dark environment. So Self camera only can take out of date Black and White at drak or low brightness environment.

Also, US Prior number 2008-015-1050 patented to Michael R. Self, entitled "Enhanced Multimedia Intrusion Notification System and Method" describes a notification system which signals portable phones through Multimedia Messaging System (MIMS), which can only send pictures, media files, or videos, up to 40 seconds at a super slow service speed. Michael R. Self's invention differs from the current invention due to the current invention has Wi-Fi function which allows the invention to connect to home or nearby Wi-Fi network, which is fashionable in the year 2017, and notify users' cellular phones or smartphones through the internet, which requires the said phones to include at least 2G, 3G, 4G, 5G, Wi-Fi, and/or Bluetooth, or future internet connectivity services to be introduced. Michael R. Self's invention also does not include a light unit for brighter illumination of dark areas during any given hour, the current invention includes LED bulb for illumination of dark areas to achieve full color, high resolution, and color-accurate pictures or videos provided to users at any time.

(16) US prior 2008-022-5120 (The 31 is outside the device)
  Stuecker products is not same as the current invention the Security light system (10) has motion sensor (30) and a direct electric powered security module (31) incorporating a storage device (63). From FIG. 1 can clear to see the direct electric powered security module (31) is located on the separated location and plug into wall outlet (21) to get AC power and transfer into (DC power). This is not same as current invention all the circuitry is inside the said security light.
  Also, can see the Direct electric powered security module (31) has the all parts including digital camera mechanism (50), Transformer (61), Battery (62), Storage device (63), Antenna (64), Transceiver (65), security code switch (66) all built-inside the Direct electric powered security module (31) this basing the out of date technical→Not like current invention for all digital data has MP4 format and use wifi channel and APPsoftware so can easily wireless transmitting out the MP4 format for digital data image . . . .
  SO this is not compatable with current inventions.
  Also, US Prior number 20080225120 by Stuecker's design consist a network transmission towards telephonic companies then towards the cellular phones (Claim one). This point is different from the current invention because the current invention uses Wi-Fi, 4G LTE or modern internet services, application data notifications, Bluetooth to notify a cellular or smart phone device, not going through telephonic companies like Stuecker's design is. Also, in FIG. 1 of Stuecker's design, it is clear to see the direct electric power (DC) is located on a separated location and plugged into a wall outlet in order to get AC power into DC power. This is not the same as the current invention, which uses more modern technology in order to fit every circuitry inside the main housing of the invention.

(17) US prior 2008-025-2730
  Hong product the illuminator (109) is supplied with an AC current from the AC power source (144) via a relay (148) which switches the AC current o the illuminator 109 on of off as determined by digital camera processor (140)-(0025) line 1 to line 4)→This is different with current invention. The current invention LED light will turn on or off basing on the motion sensor detected moving object under low brightness environment (judge by one simple photo sensor or photo diode). No need to passing through any IC.
  Hong has An image sensor 152 such as CCD or CMOS sensor is controlled by the digital camera process (140) which is too expensive for the current invention.→The current invention just activate the camera assembly whenever the moving objects been detected by Only One motion sensor.→no such expensive device.
  Hong connect with the PIR (166) and image sensor (152) and light sensor (156) with digital signal processor (140) which is different with current invention for simple use motion sensor or-and switch to turn on the LED light or-and camera assembly.
  Hong product also has USB ports to connect with unit so can get uploading the digital image to a personnel computer→This is not workable for the security light always install on high position and difficult to work for this USB wire to upload or download the digital data.
  Hong products also need memory card→but not just like current invention just save all the digital data inside the movable memory card while need to see inside digital data than use a USB wire to download or upload from high position security light
  So these are difference with Hong products.
  Further more Hong did for AC powered source. Not discuss battery operated unit. Hong also did not have any wireless transmitting at least MP4 format digital data to receiver by wifi or-and software APP such as skype, line, wechat, whatsAPP, twiter, Instagram for instantly got digital datas to review and display or print out.

Also, US Prior number 20080252730 by Hong product the illuminator (109) is supplied with an AC current from the AC power source (144) via a relay (148) which switches the AC current o the illuminator 109 on or off as determined by digital camera processor (140)-(0025) line 1 to line 4) This is different with current invention. The current invention LED light will turn on or off basing on the motion sensor detected moving object under low brightness environment (judge by one simple photo sensor or photo diode). No need to passing through any IC. Hong has an image sensor 152 such as CCD or CMOS sensor is controlled by the digital camera process (140) which is too expensive for the current invention. The current invention just activates the camera assembly whenever the moving objects been detected by Only One motion sensor. No such expensive device. Hong connect with the PIR (166) and image sensor (152) and light sensor (156) with digital signal processor (140) which is different with current invention for simple use motion sensor or-and switch to turn on the LED light or-and camera assembly. Hong product also has USB ports to connect with unit so can get uploading the digital image to a personnel computer. The current invention includes the usage of memory cards. Hong products also need memory card, but not just like current invention just save all the digital data inside the movable memory card while need to see inside digital data than use a USB wire to download or upload from high position security light. So these are difference with Hong products. Furthermore, Hong did for AC powered source. Not discuss battery operated unit. Hong also did not have any wireless transmitting at least MP4 format digital data to receiver by Wi-Fi or-and software APP such as skype, line, WeChat, WhatsApp, twitter, Instagram for instantly got digital data to review and display or print out.
(18) US Prior 2011-013-4239 (Street light)

VaDai products application for street light so all the application, construction, installation, and light output power and power consumption is different than the current invention and it also different for light need turn on from dust to dawn which is not workable for current invention which powered by motion sensor under low brightness environment only.

So this is not comparable and no any point is similar or can be replaceable.

Also, US Prior number 20110134239 by Vadai products application for street light so all the application, construction, installation, and light output power and power consumption is different than the current invention and it also different for light need turn on from dust to dawn which is not workable for current invention which powered by motion sensor under low brightness environment only. Vadai's invention also contains a heat sink, which is not in inclusion of the current invention. Vadai's invention also contains a temperature detector, which is not included in the current invention, which will also increase the cost for the total product, which is not the point of the current invention. Vadai's remote surveillance design contains no storage means just or it is ambiguous, which is different from the current invention in inclusion of SD cards, USB drives, Cloud storages, and etc. mentioned above.

Other features for invention:

The current invention involves an LED light, which may be in the form of a night light, bulb, lamp holder, flashlight, entrance door motion sensor light, garden light, webcam light, or other LED lighting device, or other light source or LED illumination device, and which has built-in digital device(s) with digital data camera to took MP4 or higher rank format photos or video, record, storage unit or system including SD card or cloud storage station, and wireless communication such as Wifi or 3G/4G or higher network with preferred software such as APP . . . etc. or display functions for digital sound, messages, photos, movies, films, audio, video, etc.

Current home security products available in the marketplace, and especially wireless home security products, are very expensive. Furthermore, not only are they too costly, they are also too much trouble to install (may need engineer to help) and too slow for big data such as full HD photos or video to use out of date transmission network and lack of software incorporated with super big storage capacity like cloud storage station, or some application need use outside control box with complicated setting which is not easily for youth or aged peoples.

To solve the problem, the current invention utilizes an power source provided by (1) an alternating current (AC) electrical outlet which the current LED light device has built-in prong plugged into outlet, or (2) LED light has a screw-in base to screw-into AC bulb-receiving socket, and/or (3) The LED light has conductive wires to get AC power source, All of them of prong or bulb base or wires is connected with circuit converting the AC power to direct current (DC) power to offer the power to said LED(s) for illumination.

In addition, the current invention incorporates a low cost, super compact Digital Video (DV) device (hereafter as DV) or any camera or same function products available at market place such as (webcam) or (driving Cam) or (Go-Pro) or other camera device, which is parts or whole unit built-into the said LED light device and preferred the camera is tiny head with tiny size so like hidden-camera built-in the said light device so bad man can not easily find while get into people house so can solve the problems of high cost and difficult installation, eliminating the need to hire professional engineers at high cost per hours and saving wasted time in waiting for an installation appointment and never-understand setting procedures.

The current invention can transmit digital data from the digital camera to the display unit while receiving power directly (1) from built-in prong of the DV or any camera or (2) from a screw-in base or (3) from other conductive skills to connected with an AC power source through the AC-to-DC circuit to provide DC power.

The current invention preferably also provides
(1) Low-cost model: a DV or any camera device having a camera and display screen in one unit so that there is no need to spend cost for transmission by wireless device for most economical model for variety of low-income person. Or,
(2) All digital data got form camera can store within the memory unit such as SD or Micro-SD card or incorporate with Cloud storage station and can show image while take it out and connect with display software. Or
(3) the preferred update model can use blue-tooth or other device or USB wire assembly to download the digital data storage inside the memory unit such as SD card or Micro-SD card or other data storage kits. Or
(3) It also can use rounder or Wifi wireless assembly to build with camera, storage unit including incorporate with Cloud storage station through communication system and APP, market available software, server, cloud storage station and send out or receiving digital data or use wireless assembly including but not limited for the email, skype, we chat, what's APP, twitter, facebook, Instagram, 17 platform or conventional platform so can make more functions including but not limited such as dial phone, call police, adjust camera operation, adjusts light functions, and transmit the digital data to desired consumer, computer, communication devices including phone, laptop, display screen . . . etc for high-end products who willing to pay for.

However, all these applications can selected parts from (a) camera can took MP4 or higher rank format photos or video, (b) storage units or incorporate with cloud storage station, (c) blue-tooth, (d) wireless transmitting, Wifi, 3G/4G/5G network, (e) SIM card, (f) circuit, (g) controller, (h) motion or moving sensor, (i)) camera, (j) webcam, (k) driving-Cam, (l) IP-Cam or (m) equal function or (n) replaced parts or accessories for LED light device still fall within the current invention scope and claims coverage.

The current invention mainly to design for light device has different parts built-in on the said light device for low-end, middle cost, high-end cost version for different functions and parts.

(A) The preferred functions as below listed;
(1) digital data storage into memory card, when needed take inside memory card or SD card or Micro SD card to display device to check digital data.
(2) digital data can download by Bluetooth or USB wire assembly or other electric device into communication device(s) including phone, computer, display device, laptop, monitor.
(3) Digital data can use wireless communication assembly to send out message, data, alert, words, sound, image to variety of communication devices including mobile phone, computer, monitor. Or,
can multiple ways communication though wireless network, 3G or 4G or update wireless network, WIFI, Router, cloud storage station, incorporated with APP or other platforms to increase more function(s), wireless network or internet equivalent or same function wireless network.

Because the DV or any type camera is built with or built-into the light device, and may including an LED light, LED bulb, lamp holder, LED flash light, LED garden light, LED entrance door light, LED patio light, LED floor light or other light source or the LED illumination device, the invention offers excellent home security for low-end, middle-end, high-end with simple installation. One advantage is that a bad man into and cannot easily find the preferred hidden-installation the said DV or any type of camera from among a variety of lighting related device(s) such as lamp holders, LED bulb lamp holder, LED flash light, LED garden light, LED entrance door light, LED patio light, LED floor light or light device on the wall or ceiling, and all the bad man's behavior been detected and recorded inside the built-in DV camera and storage unit so this will offering the best safety record to protect home and family at any time.

The storage unit's inside digital data can get by (a1) Get SD or Micro-SD card to connect with display software
(a2) Incorporate with Blue tooth or USB wire assembly or other electric device communication to download the storage unit's digital data even can download from cloud storage station while incorporated cloud system.
(a3) Incorporate with Wife or 3G/4G or current setting 5G network, rounder's wireless communication to transmit to digital device including phone, computer, laptop, display, monitor . . . etc.

Furthermore, every electric component for circuit, bluetooth, wife, rounder and related APP communication parts & accessories all built-into or built-with the said light device
(#KKK-2011 U.S. Pat. No. 8,760,514) LED light device,
(#KKK-2 U.S. Pat. No. 9,197,865) LED light device+Web cam
(#KKK-5 U.S. Pat. No. 9,549,110) LED light device+ Garden light
(#KKK-1 U.S. Pat. No. 9,560,32), LED light device+individual motion/moving sensor unit
And plurality of co-pending case including
(#KKK-3) LED light+Flashlight
(#KKK-4) LED light+individual motion or moving sensor
(#KKK-6) LED light+individual motion or moving sensor for multiple funtions
And plurality of CIP or Divison filing.
or
LED bulb,
(#QQQ-2) U.S. Pat. No. 9,551,477 LED bulb has multiple layers
(#MMM-1 U.S. Pat. No. 9,541,260) LED bulb has multiple areas illumination
(#MMM-12 U.S. Pat. No. 9,541,260) LED bulb has multiple functions
(#JJJ-1 U.S. Pat. No. 9,010,986) LED bulb has built-in camera and digital data
(#QQQ-12 U.S. Pat. No. 8,834,009) LED bulb has extendable
(#JJJ-2011) U.S. Pat. No. 8,562,158 LED bulb has built-in camera and digital data
or
lamp holder or lamp socket adaptors
(#ZZ-2010 U.S. Pat. No. 9,033,539) lamp holder had built-in LED light
(#III U.S. Pat. No. 8,711,216), flashlight, garden light, entrance door light,
floor light, patio light string as current invention, parent filing or co-pending filing case disclosure. It is appreciated all the above listed current, parent, co-pending filing still fall within the current invention scope and claim covering.

Other embodiment of the current invention, the DV or any type of camera can include an endless recording that overwrites past digital data so that it will always update new data without the need to change any storage means, so long as the initial installation is selected for certain hours of recording and certain minutes for the storage section. Or even can incorporate with cloud storage station so can save and pickup the digital data for super big number of file at any time.

The preferred DV or any camera device may have the most advanced technical features at least has MP4 or higher rank format and functions can increase while make proper arrangement and incorporate below parts for any combinations into basic LED light has camera device which may include any combination of a
(F1) wide Angle or telescope lens assembly and fine pixel/ HD
(1280.times.720 Pixel)/VGA (720.times.480 pixels)/good display screen (320.times.240 pixels) with a light weight, rechargeable batteries, and anywhere from 1.3M up to 12M or more pixels to provide VGS or HD video or ISO selection;
(F2) auto focus/tilt/rotating/moving/scan functions;
(F3) a motion sensor by PIR detector;
(F4) a moving sensor by one or pairs or more detectors and comparison;
(F5) a night vision selection (IR or equivalent or same or replaceable device);
(F6) auto power shut-off with IC or timer application;
(F7) power saving;
(F8) built-in screen;
(F9) USB assembly for data delivery including wires, USB port, USB output ends and software and hardware;
(F10) remote controller including IR or RF remote assembly;
(F11) wireless data transfer to a remote cellular phone/ computer/communication device(s) including remote controller, Bluetooth, Wifi, router, wireless transmitter and receiver device or wireless communication including wifi, 3G, 4G or future available network for wireless equipment and also including APP software, platform software, cloud storage station. The wireless communication including mutual ends communication, software setting, hardware or software communication.
(F12) auto dialing to a police station or send emails or send line-message;
(F13) auto tracking of moving object(s) from ants to elephants or other live objects;
(F14) other light means/device(s);
(F15) other wireless/remote/IR sensor/PIR sensor/motor(s) features;

(F16) any other electric or mechanical functions available from the marketplace for a digital camera or digital video recorder.

Any or all such features may be selected and incorporated with the preferred DV or any type of camera device to make sure people can see, know, and watch the desired site/events at any location/place/time.

The current invention further has other features or improvement while incorporate with MP4 formate, Wifi, 3G/4G/5G network, APP or other software for platform application, cloud storage station as below:

The DV or any type of camera device may have a plurality of cameras to provide multiple images that can be shown on a screen so as to monitor multiple areas. It will also be appreciated that the DV or any type of camera device can incorporate an IC chip and related circuitry, motor-, and a motion-sensor or moving-sensor with more than one detector heads to detected or comparison difference so allow a single camera head with auto tracking functions to follow moving objects.

A preferred embodiment of the built-in DV or any type of camera device of the current invention includes an LED bulb and lamp holder, flashlight, garden light, entrance door light, floor light, night light or variety of lighting device to provide an LED light device, night light, or security light which has prong or socket or conductive wire to connect to (1) an AC power source or (2) a big capacity DC energy storage device which directly supplies current, or (3) a rechargeable big capacity power storage device such as a rechargeable battery, and which also may incorporate with any other separate parts & accessories such as wire(s), adaptor(s), or transformer(s) to deliver electricity from the AC power or big DC electricity storage unit source to the LED device and built-in digital data device.

Furthermore, the AC power source (AC application) or DC big electricity capacity storage unit (battery operated application) may use (1) prong, (2) a AC or DC bulb socket base or lamp holder, (3) conductive wires or parts, or (4) a USB-cable that directly comes out of the light device housing, or (5) a regular 120 Volt 60 Hz plug AC wire that directly comes out of the light device housing and connects with the public electricity system for home, house, and public areas. The electric delivery between light device and AC or DC power source may select any available type from convention market for all kind of skill and method and kits.

One of the best applications for the current invention is as a webcam that already used for all kinds of computer, laptop, phone, or communication equipment. Or driving-Cam already use for all moving traffic device. Both are not expensive like the street police department use Traffic-Cam. Conventional webcams are limited in that they cannot follow moving people or objects so people have to sit in front of the webcam to talk with people. After incorporated with current MP4 image format+ Wifi or 3G/4G/5G network+ storage assembly including Cloud storage sation+ APP or other update software with LED light device and Camera device will become perfect visual products to let consumer pay the less but get the maximum protection for properties and personal safety.

Furthermore the current invention make big improvement from marketing simple LED light or Simple Camera/DV device including solve below major issues:

(Solve 1)

The webcam or any type of camera for prior arts lack of the brightness during the night time so can not have good photos, image to be seen at dark or night time environment. The current invention has LED light sufficient light so can take the MP4 high speed image to deliver out while the motion or moving sensor detected the moving objects so can take full color even the Full HD image and can instant to deliver to consumer mobile phone.

(Solve 2)

As for convention security light such as health Zenith® motion sensor LED or PAR38 bulb or halogen light device for outdoor security light device lack of the camera took at least MP4 format data, storage unit, memory card, incorporated with Cloud storage station, Bluetooth, WIFI, Server, Router or-and 3G/4G/5G network and update APP or other software to communication so all heath Zenith® products just a Motion sensor light device to offer the light only to show path to bad guys. Zenith® products lack of function to take MP4 format photo, image, sound, movement recording and replay function, so it is not really to keep people has good security and prevent bad man to do bad things.

(Solve 3)

The current invention preferred all the motion or moving sensor products such as the motion or moving sensor lamp holder as FIG. 1A, 1B, 1C, 2A, 2B add the DV or any type of camera device & memory card or-and cloud storage station so it will add only limited cost but become motion sensor security products as other issued U.S. Pat. No. 8,562,158, U.S. Pat. No. 9,010,986 and above listed LED light, flashlight, garden light, entrance door light, floor light, night light. Or for the LED bulb may has motion or moving sensor and built-in the DV cam & memory card and other optional wireless kits as U.S. Pat. No. 8,711,216. So to add the DV or any type of camera device & memory card or-and incorporate with cloud storage station with optional different combination for Bluetooth, WIFI, 3G/4G/incoming 5G network, Router transmitting or receiving kits built-into light related products including LED bulb, lamp holder, LED Flashlight, LED garden light, entrance door LED light, lamp holder adaptor, Light device which the said all related for offering the brightness for dark or night time illumination so can make the DV or Web Cam or IP Cam or Driving Cam or any type of camera device can has sufficient brightness to take full color photo, clear video into memory cards or memory unit. This also overcome the some Night Vision design to use the IR or photo diode to makeup the dim or dark brightness but such design normally make the photos or video only become BLACK and WHITE with not-clear photos or image. So Add the DV or any type of camera device and related parts & accessories as above discuss or parent, co-pending, patented is the best combination than other IR night vision design.

The alternative design of the current invention to make a individual motion or moving sensor unit to incorporated with any light source existing light device. The said individual motion or moving sensor unit has built-in camera, memory unit, and optional wireless communication combinations as desired functions and cost so can replace all marketing non-camera light device to upgrade to become has built-in camera device to increase the safety and functions. The individual motion or moving sensor unit which also can assembly for any new light device is also fall within the current invention.

(Solve 4)

The other problem for IR night vision is not perfect than use existing light device to offer brightness for dark environment or night time to take photos or video. The IR night vision has major problem for Power consumption for stand-by or operation, and wrost issues IR high vision also have high heat problem and distance range too short issues and finally is expensive cost issues.

To add only the camera and memory units into existing all kind of light source light device has no such issues. So, the current invention preferred to add camera and memory unit and optional wireless transmitting & receiving kits is the best combination.

Also, There is no need to make one new security camera with memory unit with optional wireless device. Because majority house, home, public building had all kind of existing lighting so just add or replace the current invention's individual motion sensor unit which has key Camera and system so can make all existing lighting become more useful lighting device. The said existing light device including outdoor motion sensor security light, LED flashlight, LED door entry motion sensor light, LED motion or moving sensor night light, motion sensor anywhere light which can have plug-in or battery or wired or outside transformer or outside adaptor or other power storage unit to supply the sufficient power source to make all kind of light source light device for motion activated light device.
(Solve 5)

The current invention such as FIG. 3A, 3B, 3C and FIG. 4A, 4B, 4C the LED bulb as normal market LED bulb has built-in the current invention preferable (1) camera can take min. MP4 format image, and (2) memory unit or incorporate with cloud storage station, and (3) with optional wireless communication kits. The preferred the camera is so tiny diameter for lens so it become almost called "hidden camera" or "pin-hole" camera so not easily to be found by bad man while interrupted into home, house, building while do the bad things. Especially, the current invention products apply for outdoor including garden or front entrance door or garage or back door will 100% can take bad guy full color image because bad guy wear the mask because light device offer sufficient light and camera take full color photo at the same time while motion or moving sensor triggered at night or dark environment at outdoor areas.

Same as applications for Lamp holder, lamp holder adaptor, all kind of lighting as list on this invention. The preferred the camera is belong to hidden-camera or pin-hole camera so not let people easily find the location of the security camera and destroy it. This is other feature for the current invention to overcome market camera location been notice and destroy by bad man.
(Solve 6)

From FIG. (8A)(8B) show the portable Flash light has built-in DV, memory unit, and optional wireless communication such as WiFi, 3G or 4G or future wireless transmitter or receiving kits to offer the police or army or military or security person can have the super bright light source to incorporated built-in DV and memory unit and optional wireless communication to incorporate with cloud storage system and 3G/4G/incoming 5G network or more high-tech settle-lite networks or army own network or channels to take photos, take video, offer on-line image though the optional wireless communication to the viewers to see the record or on-line or on-air instant live image to make sure the safety and status while people use the flash light. While use for Army or Military purpose the DV or Camera can incorporate with above discussion for night time or dark environment to use the (1) Visible flash light beam to offer brightness or (2) unvisible IR or photo diode to make the dim or dark environment to show the surrounding status and not let enemy see the Visible light beam and shoot the army or military team and persons however the unvisible IR or Photo diode still can offer black & white or green image so still become $2^{nd}$ choice but for battle field it is OK, however still need incorporated current invention disclosure the MP4 format image+cloud storage station+high speed wider channel wireless transmittion including settle-lite system+APP or update software or plateform+displayer device+good communication device so can see all status at everywhere at any time.

The flash light offer super good brightness let the DV or camera or IP Cam or driving Cam or WebCam can take nice photos, video, on-line message with colorful image to viewer even Full HD or higher so can become court case evidence which superior than IR night vision device for only black & white. Same for other lighting device did as above discussion. This is offer the portable flashing light or wearable flashlight for people to report or send out image by wireless communication equipment to the phone, computer, screen, communication equipment to report the people status or environment at the dark or evening environment.

This is unique and the power can be DC power source or rechargeable Power source or wireless recharge power source by market available charging or battery storage units with sufficient big capacity of the electricity.
(Solve 7)

The current invention for light device has communication assembly which have multiple-ways communication functions while incorporate with related or update software such as APP so can increase function including (a) talk though the security light (b) control the camera angle, position, focus, orientation, setting, adjust details (c) send out email, alert, words, talk, chat, dial to police station, connect with government utility service though the existing wife, router, internet, wireless network, 3G or 4G or future wireless network, even for settle-lite channel or military special channel, so can check all areas or locations status at any time though the wireless communication assembly or kits or device which built-in or built-with on the said security light to make the all digital data can be communication.
(Solve 8)

The separate and individual the motion or moving sensor has built-in or built-with digital data device(s) and camera(s) related parts and accessories can let all non-camera motion sensor can upgrade to the built-in or built-with camera(s) motion sensor security light while replace the current invention built-in camera motion or moving sensor unit assembly with the other light source set, so can let consumer use the less cost to get the upgrade motion sensor has built-in camera to increase the home, house, office, environment space safety for less cost increase. Even, People can hang or put a sign, a sticker on the front house to show (Smile the hidden video is recording now!) to get the bad guys away from the residential house or office or business areas.

The current invention make the combination for the non-expensive and whole existing unit or selected parts & accessories of compact size of the Web Cam or DV or Driving Cam to put into or assembled with the existing or old light device so solve the all above list issues and most important this arrangement total solve and upgrade all non-camera light device which are (1) lack of brightness to take good photos at the dark environment (2) Add the camera, memory means, power storage unit, wireless transmitter & receiver, Bluetooth, WIFI, Rounder, motion sensor will total increase safety for properties and people so this should save a lot of money for Federal for overtime work of police to find witness while bad thing happened.

Also, The embodiment of the current invention that provides a USB-cabled light device with a camera head having an auto tracking assembly will make an excellent auto-tracking webcam to let people freely move while talking with other parties.

Another preferred feature is to include foldable or retractable prongs so that the device can be carried anywhere such as (1) flashlight (power fail or inductive charged type or motion sensor or other multiple funtions type), (2) Night light or (3) night light has USB charger products or (4) plug-in outlet with built-in rechargeable light products or (5) screw-in bulb receptacle or receiving socket LED light device has built-in hidden camera assembly. The current invention may have different constructions that provide an LED light with a built-in digital data device capable of being moved and used anywhere, including a car, motorcycle, boat, bus, truck, or other transportation equipment or outdoor activities. The carry or portable Light device as long as has (a) the foldable or push-in/push-out prong or (b) screw-in base with switch on-off products is incorporated with a proper receiving-ends and adaptor or receptacle or socket, or (3) has male cigarette plug or male USB plug to connect with cigarette lighter or USB-port female receiving end or socket so those (1)(2)(3) can has maximum functions and can take photos by sufficient light from unit with compact camera built-in and optional current invention discussed parts & accessories to make more than 2 function carry on anywhere good products.

Furthermore, the DV or camera device may have a variety of functions, parts, and accessories to get desired functions. The DV or camera device parts and accessories may be selected from different camera heads, kits, lenses, optics means, Lens assembly, night vision means, means for detecting motion by image screen or motion sensor, vibration sensors, sound sensors, storage means, SD cards, Micro-SD cards, memory sticks, memory means, operation functions, power saving circuits, screen touch panels, exposure means, and/or motor means, as well as means for adjusting or selecting clearance, pixels, sharpness, ASA, and so forth. Another preferred embodiment of the DV or camera device of the current invention is to add the DV or camera device to a lamp holder and LED bulb. A majority of Varity light source lights and lamp holders are installed at a position which is higher than people's height, so that they will easily record moving objects without any objects blocking the camera shooting directions. Furthermore, the current invention not only can provide an LED bulb or lamp holder with a DV or camera device, but also for all kind of market available variety of light source light device including a night light that incorporates a wider angle camera lens so that it can look for moving objects from an unnoticeable position.

The current invention also can apply more than one camera head with a divided image on screen to save cost or use only one camera head that incorporates more than one sensor-means and an IC circuit to calculate a position or orientation difference to delivery electric signals to a motor-means to move the camera head toward a moving object and thereby provide an auto tracking camera. Still further, any equivalent or same function will still fall within the current invention and can be added to the preferred DV or camera device devices to provide nice, clear digital data and storage into a memory-means powered by an unlimited power source without causing worry about battery power or bad electric wire installation, unlike the conventional home security equipment.

In embodiments involving a lamp holder, insert parts may be provided to connect with an original lamp holder's receiving socket to change the lamp holder's current, functions, current type, voltage, and features, such as changing from AC to DC at a certain voltage and amperage, adding cameras and related parts and accessories, adding LED device current triggers, adding IC chips to operate desired functions, adding a tracking motor device, adding a motion or moving sensor(s), adding remote control parts and accessories, adding an infrared nighttime vision function, adding memory means with related parts and accessories, adding display means, adding transmitter means to transfer digital data to a remote distance, adding auto dialing system, and adding an internet connect function or any other electric or mechanical functions based on market requirements.

The lamp holder may be selected from market-available items, and may hold one or more light means, including any of an incandescent, fluorescent tube, PL, CFL or LED light for use with a variety of different bases, which may be in the form of a screw base, bayonet base, two pin base, twist base, or push and twist base. The lamp holder is connected with the unlimited power source when the lamp holder's insert means is connected with the original lamp holder receiving means so that the power can be obtained from the original lamp holder's unlimited power source.

The camera incorporated with the lamp holder of this embodiment, like the camera of any of other embodiment, can consist of desired parts and accessories including lenses, optics piece, electric parts, mechanical units, circuit, integrated circuit (IC), data delivery system, data storage assembly or cloud storage station, USB assembly, cable, microphone, recorder, displayer, sensor for any type, PIR remote controller, IR remote controller, night vision system, flasher, switch, motion detector, moving detector sets, sound detector, photo sensor, motor, tracking assembly or other market available parts and accessories to allow people to get digital image, video, and audio data and record it in memory or cloud storage station or send/transmit the data to a communication device, computer device, receiver device, and/or display device to provide predetermined functions, effects, and performance.

According to another preferred embodiment, and LED bulb includes a plurality of LED-units that fit within a bulb housing having an appropriate shape and dimensions, and positive and negative electric contracts to get power from the power source when the electric-contacts connect with the power source and the power source is thereby connected with the desired electric parts and accessories, which may include circuit, IC, conductive parts, switch, motion sensor, moving sensor remote controller, IR or RF remote controller, or other electric or mechanical device to cause the LED-unit(s) and the camera to be activated with the LED bulb and it is appreciated that the LED bulb can selected all above discussed parts and accessories for its added parts and accessories and image can display for all the above-mentioned pre-determined function(s) and performance(s).

The LED bulb has space to install the camera on its housing by using or together with any of the following: joint kits, rotating set, connector, spin device, catcher, a gear-set, a motor set, controller, IC, moving sensor head(s), motion sensor, tracking assembly, memory assembly, displayer, screen, USB assembly, conductive parts, digital data delivery system, battery, rechargeable battery, power fail functions, or others to provide the camera that fit-into or built-into or built-with the LED Bulb to have desired functions, features, and performance.

The space in the LED bulb may include a pole(s), block(s), piece(s), and/or compartment(s) having properties that cause the bulb or space to be extendable, retractable, foldable, rotatable, and/or transformable so that the related parts and accessories can be increase more space to allow all parts & accessories can installed within and prevent from any block-object to interfere the wireless signal to delivery as co-pending and patents disclosure.

The camera may be turned-on and turned-off by moving or motions sensor, a PIR sensor head, moving detector head(s), more than one moving sensor head(s), remote control, switch, motion detector, vibration detector, heat sensor, and/or smoke detector, so as to take photos, video, and audio and provide colorful, clear, and sharp digital data to be saved in storage means, shown on a screen, shown on a wireless screen, shown on a monitor(s), or transmitted to a communication device, computer device, Internet device, or auto dialing device.

The LED-units, camera, sensor(s), remote controller, moving LEDs device, moving sensor, moving camera device, motion detection unit, heat detection unit, smoke detector unit, motor, auto tracking assembly, and so forth can be installed on a fixed housing, moving housing, or extendable housing, so as to provide a desired sensor range, distance, and angle with a variety of selection options for the camera's pixels, focus range, and/or pictures per second, for video/movie and sound/audio upon activation of the camera to shoot and store the digital data into the memory piece or cloud storage station, communication device, computer device, consumer electric device, screen, or monitor(s).

Finally, the light device including the Flash light as FIGS. 8A and 8B) has built-in Camera, memory kits, and optional wireless communication device may also take the form of variety of the light source light device selected from market available light devices such as a night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED motion sensor with auto tracking means, LED patio light, or any other LED light device available from the marketplace.

BRIEF DESCRIPTION OF THE DRAWINGS

FIG. 12-A, 12-B, 12-C, 12-D, 12-E, show the individual separate motion or moving sensor unit has built-in digital data device at least has desired combination selected from camera(s) minimum has MP4 or higher format image, digital data storage kits or capable to connect with Cloud storage station, memory card, cloud storage station, SD card, Micro SD card, IR motion module, moving detector heads sensor, Bluetooth Module, Wireless Module, control module, photo sensor, circuit and conductive wires, wireless communication set, wifi, 3G/4G/5G network or settle-lite channel, USB download kits, blue tooth, controller, circuit so can put the individual and separated motion or moving sensor unit has built-in camera(s) to the best location alone or fit into LED light device for wider detect angle, hidden location to protect people home, residence, office, small business. The said separated motion sensor unit may has built-in camera(s) has optional IR night vision optics kits to help people take the photos under low or no brightness environment for recognizable image while unit install alone for black-n-white or has Light source so can get the colorful and nice image, or can use the Light source brighter lights to take photos or video under lower or no-brightness environment while work with light device for the colorful and nice image.

FIG. 12-F, 12-G, 12-H, 12-I, 12-J, 12-K, show some current invention's preferred models to upgrade the current market available non-camera motion sensor security which has different light source, construction, number of light units, shape, brightness, sensor range, sensor distance has built-in Motion sensor or separate motion sensor, or separated wireless motion sensor unit, has IR night vision or without the IR night vision. All these preferred embodiments for FIG. 12-F, 12-G, 12-H, 12-I, 12-J, 12-K are some of preferred embodiment for the whole sets of the motion security light but not limited to these embodiments.

FIG. 13 show the Multiple functions for current invention for any combination. The all features for each electric parts or accessories has details discuss on above but not limited for limited text inside this filing. It is appreciated that all the co-pending filing, patented parent, current invention all claims or disclosure should be fall within the current claims coverage.

FIG. 14 show the preferred the one of the PIR head with Digital not analog so can prevent from false triggers.

DETAILED DESCRIPTION OF THE PREFERRED EMBODIMENTS

Figure 1A:
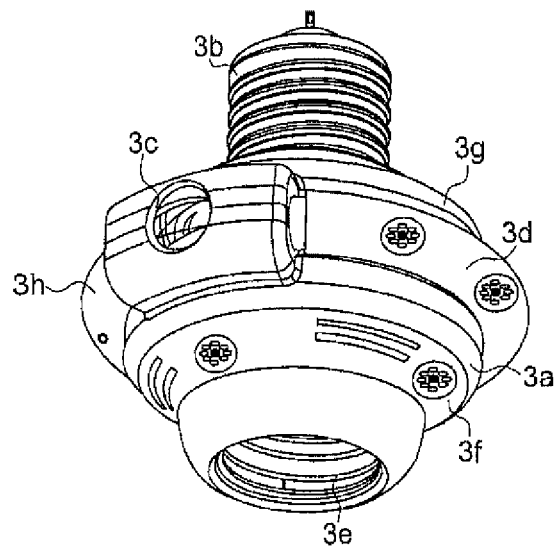
FIGS. 1A, 1B, and 1C show a lamp holder according to a first preferred embodiment of the current invention has built-in DV or camera assembly, memory cards and optional wireless communication device(s).
Figure 1B:
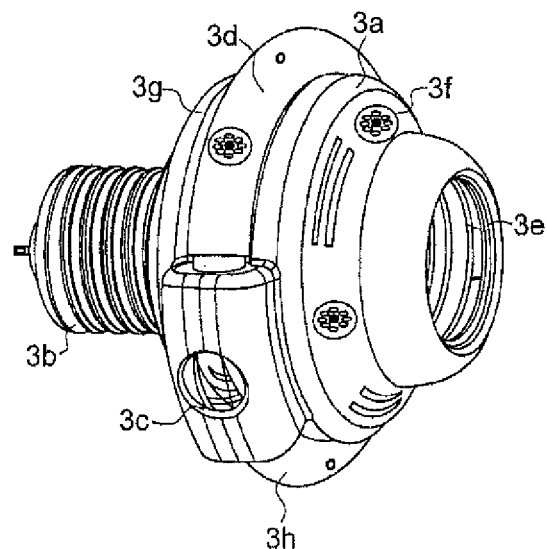
Figure 1C:
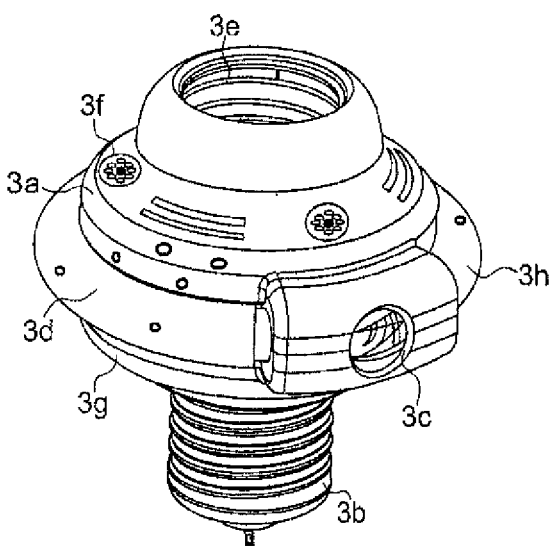
Figure 4A:
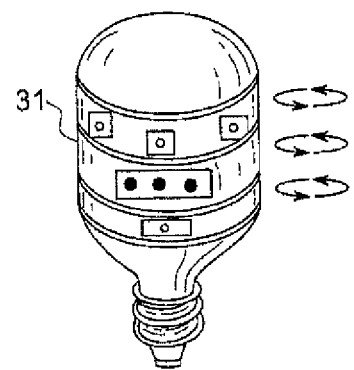
Figure 3C:
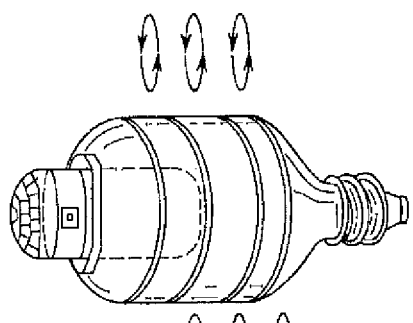
Figure 4C:
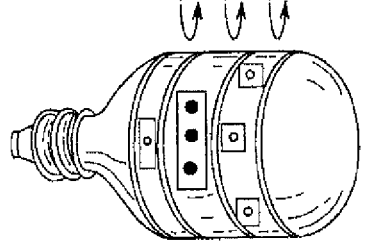
Figure 4B:
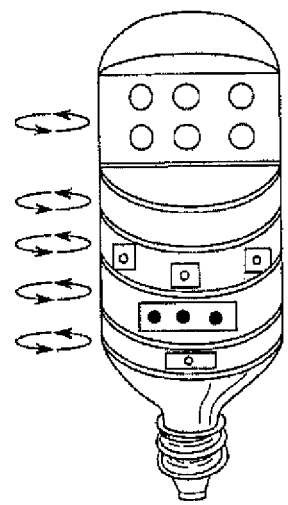
Figure 3D:
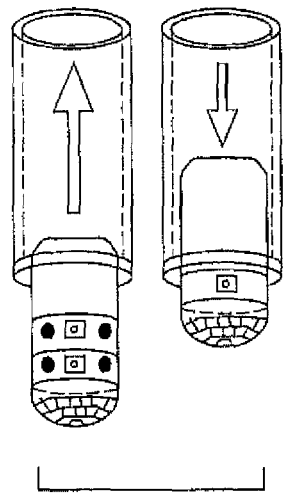
FIGS. 3D and 3E show a fourth preferred embodiment of the current invention, also in the form of an LED bulb which install on ceiling has extendable parts to get better wireless communications prevent from wall thickness to interfere the signal delivery has built-in DV or camera assembly, memory cards and optional wireless communication device(s) at least has above features of each parts.
Figure 3E:
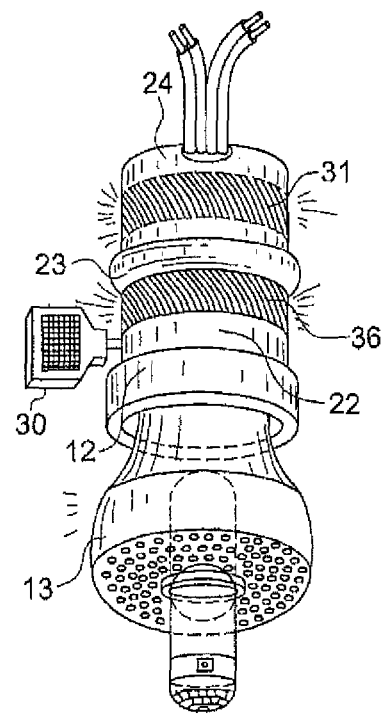
Figure 5A:
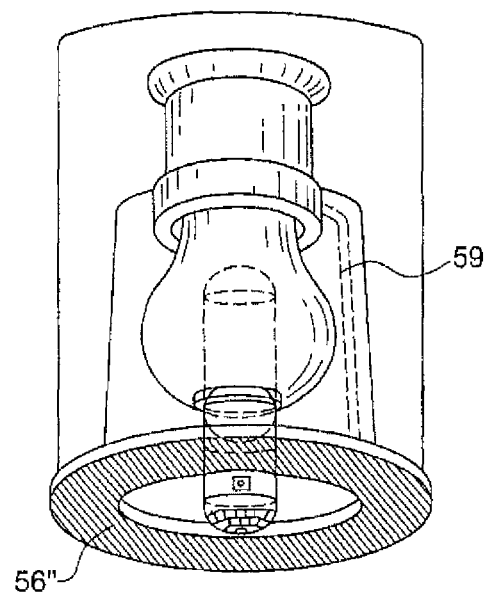
FIGS. 5A 5B, 5C, and 5D show another embodiment of the invention in the form of an light device has current invention's LED bulb has built-in DV or camera unit, memory cards and optional wireless communication device(s) wherein has separated parts or accessories can supply desired circuit or current or signal to the said LED bulb.
Figure 5B:
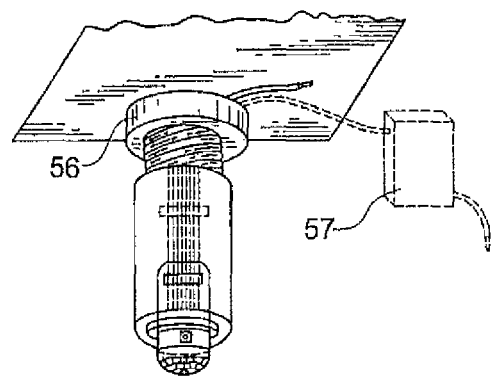
Figure 5C:
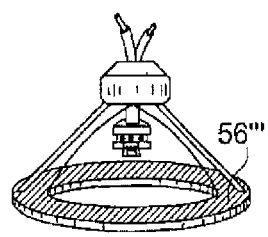
Figure 5D:
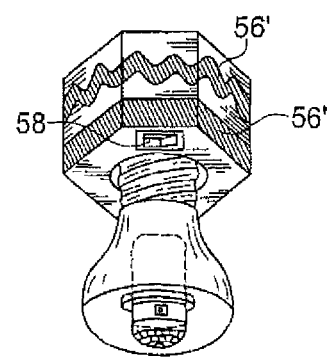
Figure 6A:
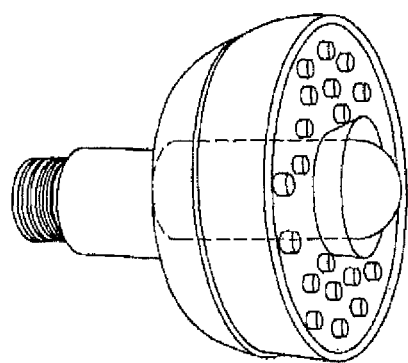
FIGS. 6A, 6B, 6C, 6D show a variety of different LED bulb designs which can have built-in digital data combinations and be powered by an AC or-and DC power source according to the current invention.
Figure 6B:
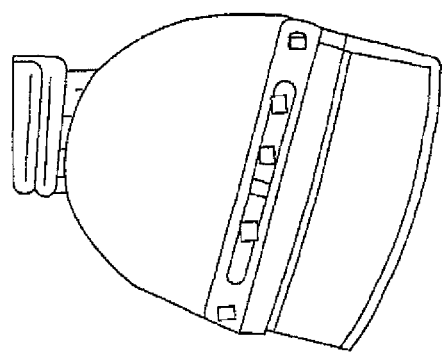
Figure 6C:
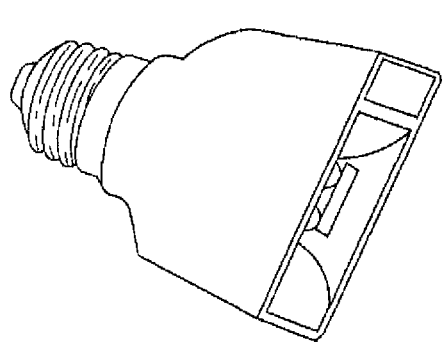
Figure 6D:
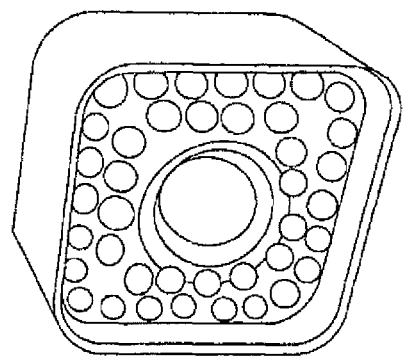
Figure 7A:
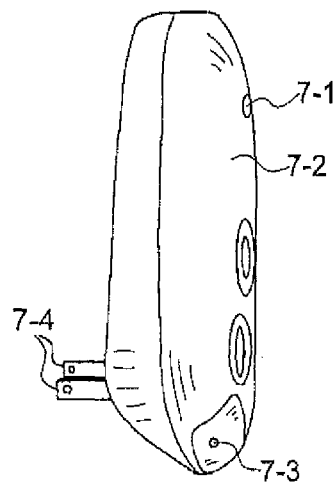
FIGS. 7A, 7B, 7C, and 7D show another embodiment of the current invention in the form of a light device having built-in digital data combination and powered by an AC power source.
Figure 7B:
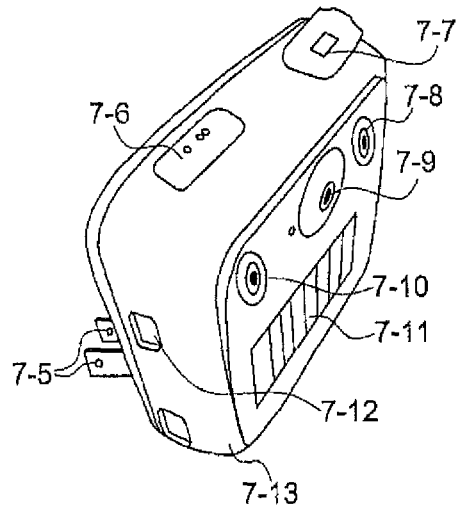
Figure 7C:
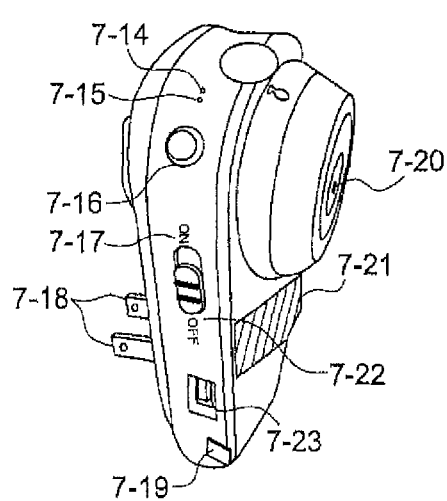
Figure 7D:
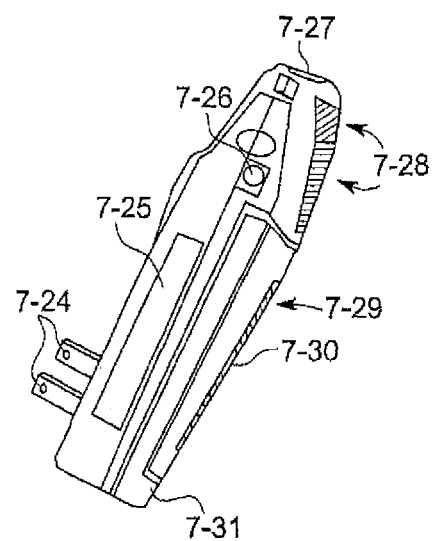

The invention is a device having digital data that is powered by an AC unlimited or DC Big capacity electricity storage unit power source and built-into a lamp holder (FIG. 1A, 1B, 1C, 2A, 2B), LED bulb (FIG. 3A, 3B, 3C, 3D, 3E) (FIG. 4A, 4B, 4C) (FIG. 6A, 6B, 6C, 6D), or light device (FIG. 5A, 5B, 5C, 5D) (FIG. 7A, 7B, 7C, 7D) (FIG. 9A, 9B, 9C, 9D, 9E, 9F) (FIG. 10A, 10B, 11A, 11B) including the Flash light (FIG. 8A and FIG. 8B) and other LED light device including but not limited including garden light, entrance door light, floor light, patio light, garage door light, pavement light. The following description was included as notes in the original drawings, and are now included herein:

FIGS. 1A-1c) show a device in the form of a lamp holder or lamp adaptor or light fixture insert (3d) with a screw-in base (3b) and a built-in camera head (3f) that can be screwed into an existing light fixture female lamp socket or bulb holder to add digital camera functions, with power being supplied through an elastic terminal or traditional bulb-terminal at the top of the light fixture insert when the insert is screwed into the existing light fixture which power source can be AC or DC power source. The insert includes a female receiving socket (3e) into which a market available all kind of bulb male base may be screwed to receive power from an unlimited AC house electricity power source or DC big capacity energy unit through the built-in insert male base (3b). A sensor (3c) may a photo sensor or-and motion sensor or A pair of moving sensor like (3g) (3g') which is moving detector and comparison device and IC are provided to sensor the moving of objects or alive animal or people and control to turn on and turn off the said Light device (not shown) or-and the camera at same time or different time. By replacing a conventional bulb in the existing light fixture with the illustrated lamp holder or lamp adaptor or insert (3d), a security camera can easily be installed without the need for expert installation. When the bulb is then screwed into the socket, the resulting installation will look like an ordinary light fixture and therefore bad guys will not notice the camera (preferred is hidden or pin-hole size camera for tiny unit). The camera can include night vision or infrared capabilities, and tracking features, and the insert may be waterproof to protect the camera and electronics while use for outdoor application. The bulb may be an incandescent bulb, or another type of bulb such as an LED bulb or CFL or any other light source bulb. The adaptor or lamp holder of insert (3d) may be screw type, or pin type or bayout type of any other type available from market place not limited for only screw-in and screw-out type. The insert (3d) my has other added device which shown on the drawing without marking for any preferred device can increase the said insert (3d) function including but not limited such as microphone, speaker, antenna adaptor, SD card slot, Memory card slot, wifi receiver or transmitter, . . . etc.

Figure 2A:
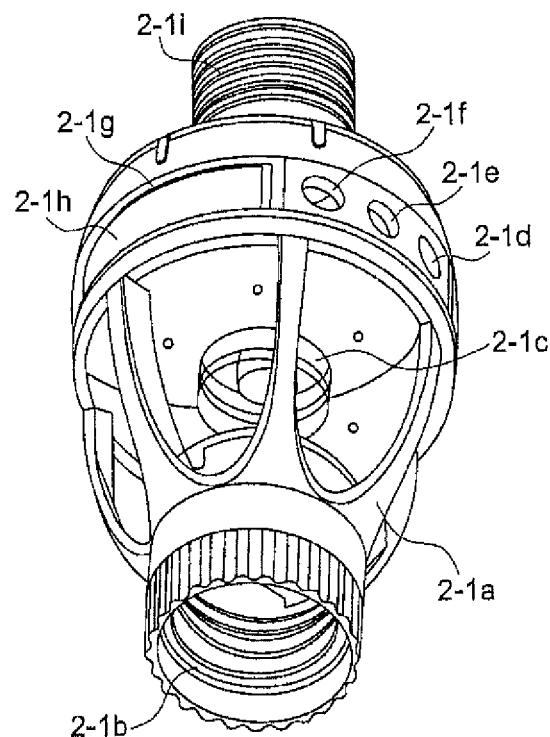
FIGS. 2A and 2B shows a lamp holder of a second preferred embodiment has built-in DV or camera assembly, memory cards and optional wireless communication device(s).
Figure 2B:
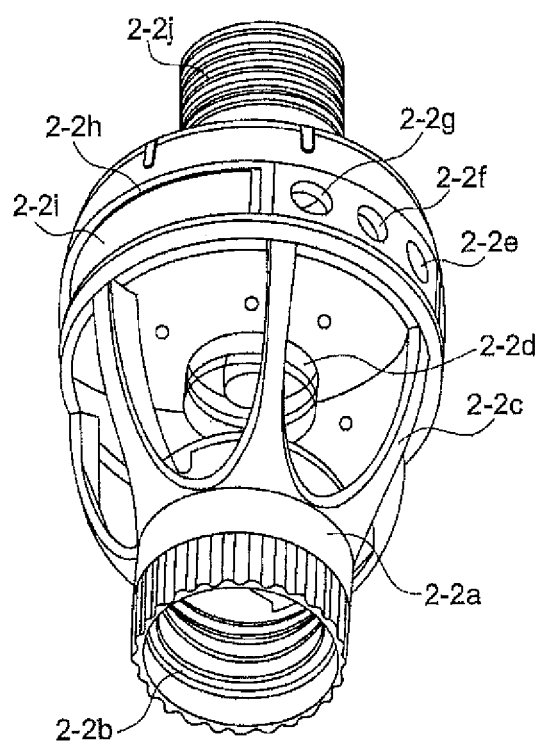
Figure 3A:
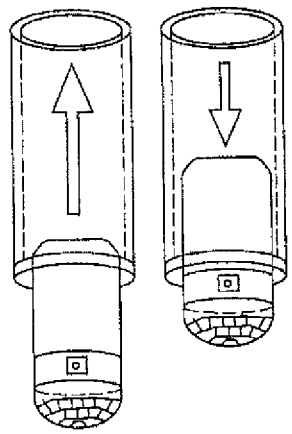
FIGS. 3A, 3B, 3C, 4A, 4B, and 4C show a third embodiment of the current invention in the form of an LED bulb has built-in DV or camera assembly has minimum take MP4 or higher grade image or data, memory cards or incorporate with cloud data storage station and optional wireless communication device(s) selected from Wifi, 3G/4G/5G network or even settle-lite channel to display or phone or computer or screens or monitors.
Figure 3B:
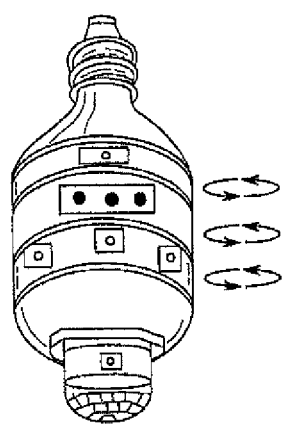

FIGS. 2A and 2B show an arrangement similar to that of FIGS. (1A-1C). In the arrangements of FIGS. (2A and 2B), like that of FIGS. 1A-1C), the camera preferably faces downward from a ceiling installation, and the motion sensor (2-1h) or moving sensor detector sets (2-1F) (2-1e) or any combination sensor-assembly (may including other type sensor or photo sensor 2-1g which may put inside or under 2-1h motion sensor's Fresnel lens). The sensors or sensor assembly causes the camera (2-1c) or desired number of Led light source (small dots) to start recording or turn on the LED light at the same time in response to detection of motion or moving objects in the field of view under pre-design condition and programs.

The alternative or more features for the sensor or-and camera or-and LED light source or-and signal receiving or transmitter unit or-and IR remote controller receiving unit can install or built-in on extendable housing, body (FIG. 3A) which maybe in many layer (FIG. 3B) and each of layer can be rotate to adjust the orientation or direction of the said LED light device, lamp holder, LED bulb similar as shown in FIGS. 3A-3C and 4A-4C).

The sensors and/or camera or-and above discuss electric parts & accessories can be extended or retracted and rotated to avoid interference by lamp shades, lamp covers, lamp walls, or other blocking items that otherwise might block a field of view of the camera or sensor while the current invention to apply for LED bulb like (FIGS. 3A-3C and 4A-4C) drawing shown.

The device may have multiple rings, each of which is separately rotatable to enable separate rotation of the sensor(s) and difference camera heads or-and LED(s), as shown in FIGS. 3A-3C and 4A-4C). As shown in the LED bulb inside the light device FIG. 3D) and FIGS. 5A-5D), the extension may enable the position, orientation, or angle of the sensor or camera head or LED(s) to be varied, or enable the sensor to be extended while the lamp holder or LED bulb or LED light device or lighting feature is within a shade, (for entrance door LED light, the LED bulb or sensor or camera may within the glass material housing) the device may further include external light elements such as lighting elements (31) and (36), as well as additional sensors such as sensor located inside the extendable tube.

As shown in FIGS. (6A-6D), a variety of LED bulbs may be inserted into the light related device which has traditional base, extendable base (Same as co-pending filing and patented parents). All these different type LED bulb has built-in camera or DV can take minimum MP4 format image including photos or video for digital data so can quickly saving or transmit out to memory card or cloud storage station to get on-line stream digital data while these digital data saved into memory card or wireless transmitted by wifi though 3G/4G/5G network or even through settle-lite channel with or without APP or other software to get more control functions by good program software so can do a lot of desired work including (1) adjust or setting the camera/the light sour for angle/orientation/shooting properties adjustment, or-and
(2) adjust lighting brightness/light turn on period of time/light color/light duration, or-and
(3) adjustment, microphone/speaker communication relative properties or functions including volume, or-and (4) send out phone/text/photos/video by wifi, skype, email, twitter, what'sApp, WeChat, Instagram or other platform software, or-and (5) call for police department/relative/fire department/ambulance/hospital/security company, or-and (6) setting the sensitivity of the motion or moving or short or flood or fire or photo sensors, or-and The All kind of LED bulb as show on FIG. (6A to 6D) is some preferred popular model. It also can be different size including most common use for PAR38 shape and size which while add the motion or moving sensor with built-in camera with memory card or incorporated with cloud digital data storage station can save or transmit the camera device took MP4 or higher rank image, photos, video to phone which has APP software with design programs so can check pre-set location status, and do a lot of other desired function as above listed (1 to 6) for setting, adjustment, program, call, digital data delivery. It is appreciated that all above listed multiple funtions only for example which not cover all market available function but it should not limited for listed function, it should be cover all market available functions.

The Light device has built-in DV or camera device and memory kits and optional wireless communication system as FIGS. (7A-7D) show some of preferred light device has built-in digital camera or DV has built-in lighting devices. These device shown on FIG. (7A to 7D) with built-in prong to connect directly to an house electricity power source to get unlimited AC power source such as a wall outlet or extension cord outlet, and also has built-in sensors that can be used to provide control the light device and camera unit or-and auto tracking functions. It will be appreciated that the camera or DV devices include;

(1) Lighting function and camera which can take at least MP4 images both can activated as pre-programmed such as (a) camera take photos or video always or period of time during day time such as per second or minutes. (b) camera take photo or video while sensor been triggered any time (d) camera take photo or video while light source turn on at the night or dark environment (e) light device and camera activated by any pre-setting program.

(2) built-in prong or bulb-base or wired to get AC or DC or both power.

(3) and/or various preferred function or features as above or the current invention discussed inside all text and below more details for all functions.

The multiple functions LED light has built-in DV or camera of FIG. (7A) may include an LED (7-3) to serve as a night light or a big size light source (7-2) for camera device and a DV or camera device or-and has pair of moving detectors/sensor (2 round circles) or-and motion sensor and, while the DV or camera device of FIG. (7B) includes foldable prong (7-5), a pair of LEDs work as night light or-and power fail light (7-12), a pair of moving detector sensor (7-8)(7-9) as well as a microphone and speaker (7-11), memory card slot (shown on other side of 7-13), multiple section for auto/on/off/setting switch (7-6), camera head (7-9), and USB ports to deliver the digital data (7-7) and hidden antenna, wireless transmitter, wifi or 3G/4G/5G network assembly (not shown) and wireless communication circuit inside the housing. The device of FIG. (7C) is a multiple functions LED projection light device (from top project image output-end) with foldable prong (7-18), multiple sections switch including auto/on-off/selection/power/photo/video/including LED indicator lighted switch (7-17), microphone and speaker (7-16), indicator LEDs (7-14) and (7-15), camera head on center and LED light on ring to offer flashlight brightness illumination (7-20), motion sensor Fresnel and inside has photo/shock/smoke/flood sensor/or has pair of window to install for a pair of moving detectors sensor (7-21), USB port for digital data delivery or other adaptor (7-23), and micro SD card slot (7-19) and had all circuit for wireless, wifi, cloud communication system built-into inside of the housing (7-14).

The device of FIG. (7D) is a multiple functions LED night/power fail/light with a built-in displayer or screen light function, including foldable prong (7-24), a memory card or-and USB adaptor compartment or-and back-up battery (7-25), an audio assembly including speaker and microphone (7-26), a swivel or rotatable camera head in center and has plurality of LED(s) on ring or donut circle (7-27), an motion or moving detectors sensor or other type sensor(s) fit within or behind the motion sensor Fresnel lens (7-28), an electroluminescent or LED light for big area illumination (7-29), an antenna compartment (7-30), and a foldable compartment for a screen or displayer (7-30), the other sides of the LED light device has parts & accessories select from power/model selection/setting/Auto for power fail function/All Off switch which has multiple sections. All circuits, IC, electric parts & accessories, all kind transmitter or receiver for wifi, 3G/4G/5G network, settle lite channel, connect cloud digital data storage station, MP4 format creating circuits . . . etc all fit within the housing.

Figure 8A:
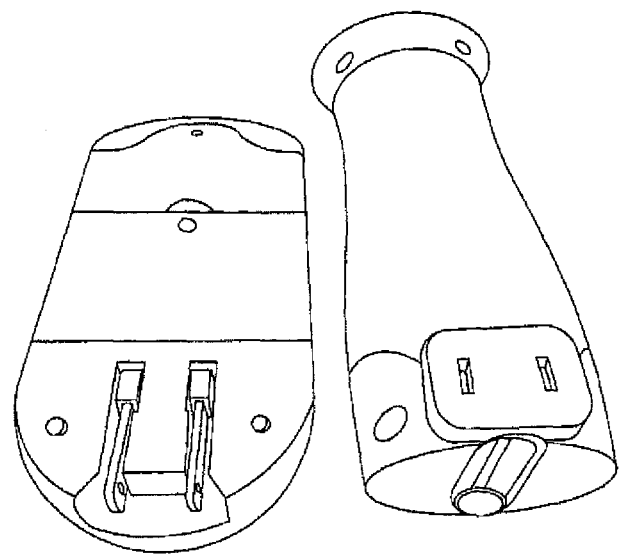
FIGS. 8A and 8B show a foldable or retractable prong construction and details for Flash light or multiple functions LED light device which has built-in DV or camera unit, memory cards and optional wireless communication device(s) for security or military or army or police to use with different material and carry design so can easily hold, carry, attached on pocket, helmet, waist or weapons.
Figure 8B:
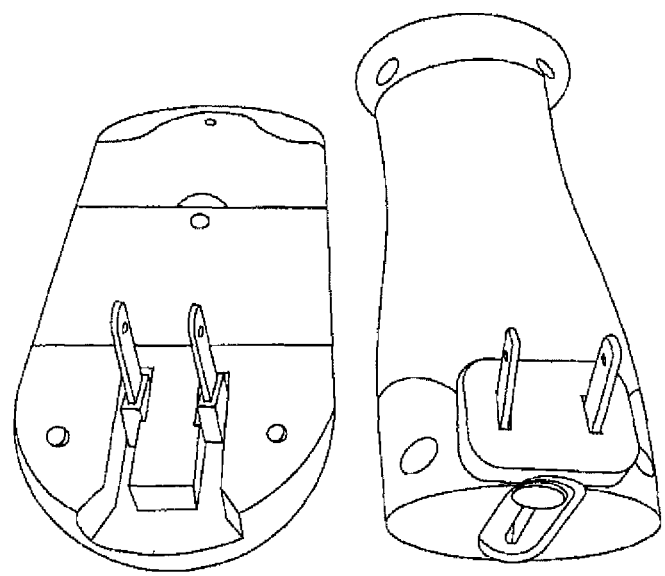
Figure 9A:
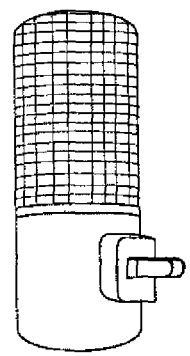
FIGS. 9A, 9B, 9C, 9D, 9E, and 9F illustrate a size comparison for a traditional LED night light versus a plurality of current invention for Digital Video/Camera units which has all kind of light source for illumination powered by DC Power for light device has built-in camera kits, memory card, optional wireless transmitter to communicate system including wife, 3G/4G/incoming 5G/even for settle-lite network, Cloud data storage station with preferred APP or software from variety of platform so can make expected function(s) for camera or light device by wireless system.
Figure 9B:
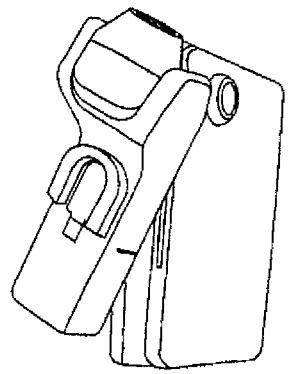
Figure 9C:
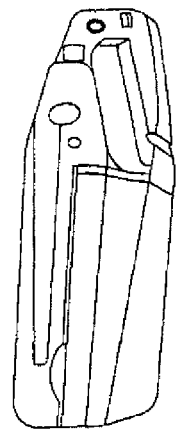
Figure 9D:
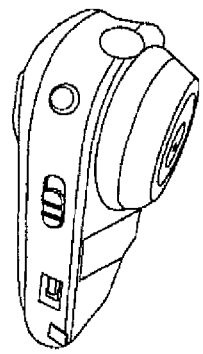
Figure 9E:
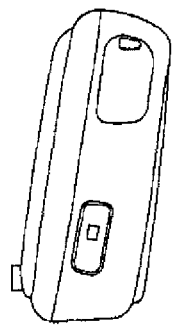
Figure 9F:
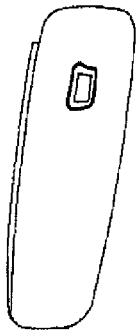
Figure 10A:
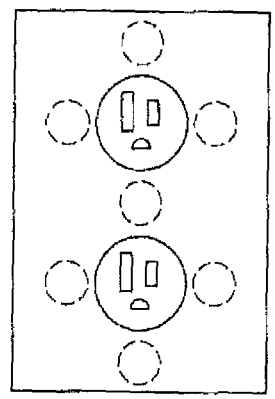
FIGS. 10a and 10b show an embodiment of the current invention which uses a plurality of suction cups to reinforce the prong and hold a super heavy device on a wall outlet cover plate which is a light device has built-in DV or camera device, memory cards and optional wireless communication device(s).
Figure 10B:
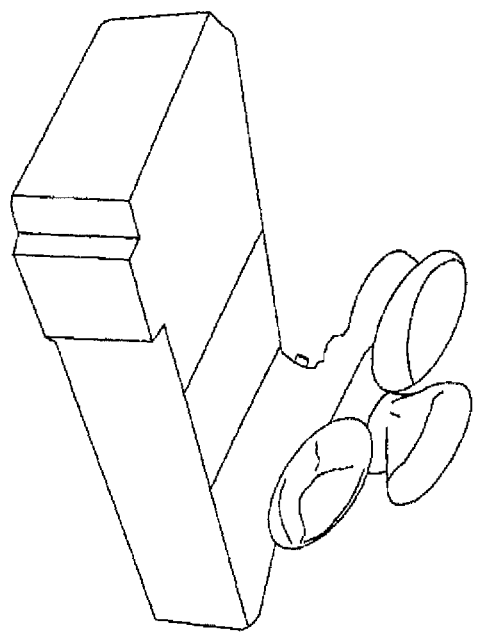
Figure 11A:
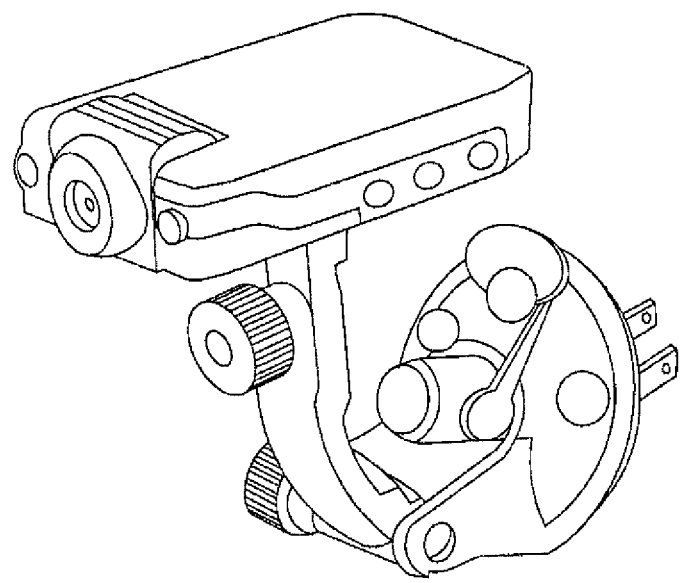
FIGS. 11a and 11b show another embodiment with a plurality of suction cups for light device has built-in DV or camera device, memory cards and optional wireless communication device(s).
Figure 11B:
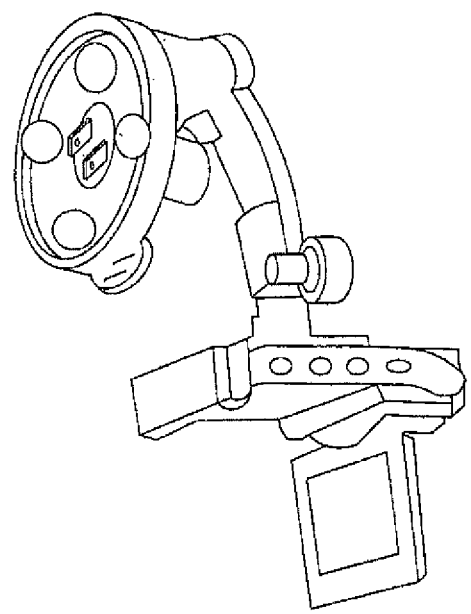

From the FIGS. (8a and 8b) show the other light device application for portable or wearable flashlight application as from the FIGS. (8a and 8b) so devices with foldable or extendable prongs. In FIG. 8a, the prongs are folded or retracted while people use flashlight so easily hold by hand or put into pocket, while in FIG. 8b, the prongs are extended for recharging from the outlet which inside housing or within the extension cord or power cord or other AC or DC power source has outlets. From FIGS. (8A and 8B) has all above discussed FIG. (7A to 7D) all related parts & accessories so can offer not only the simple flashlight of super strong light beam with or without focus adjustable to make clear and brighter area for sufficient lighted area so can offer the built-in camera unit to take photos under night or dark environment. Also, The Flashlight has built-in camera as above discussed has MP4 or higher rank image shooting capability+Storage SD or Micro SD card or connect to cloud digital data storage station+Wifi or 3G/4G/5G and preferred APP or software has pre-determined programs to make people see screen of area and further operate all added or wished function as above discussed.

From FIG. (8A)(8B) show the portable Flash light has built-in DV, memory unit, and optional wireless communication such as WiFI, 3G or 4G or future wireless transmitter or receiving kits to offer the police or army or military or security person can have the super bright light source to incorporated built-in DV or camera unit(s) and memory unit and optional wireless communication to take photos, take video, offer on-line image though the optional wireless communication to the viewers to see the record or on-line or on-air instant live image to make sure the safety and status while people use the flashlight. While use for Army or Military purpose the DV or Camera can incorporate with above discussion for night time or dark environment to use the (1) Visible flash light beam to offer brightness or (2) unvisible IR or photo diode to make the dim or dark environment to show the surrounding status and not let enemy see the Visible light beam and shoot the army or military team and persons.

The flash light offer super good brightness let the DV or camera or IP Cam or driving Cam or WebCam can take nice photos, video, on-line message with colorful image to viewer.

Same for other lighting device did as above discussion. This is offer the portable flashing light or wearable flashlight for people to report or send out image by wireless communication equipment to the phone, computer, screen, communication equipment to report the people status or environment at the dark or evening environment.

This is unique and the power can be DC power source or rechargeable Power source or wireless recharge power source by market available charging or battery storage units with sufficient big capacity of the electricity.

FIG. (9b) shows a typical night light to show the size and dimension so can compare the current invention's LED light has built-in camera kits, while FIG. (9b) shows a device with multiple camera heads, which can easily fit within the approximate dimensions of the night light. FIG. (9c) shows a night vision digital video device with a motion sensor that can be upgraded for auto tracking FIGS. (9e-9f) show extra small and slim digital recording devices that can be incorporated into a lighting device according to the principles of the invention.

FIG. (10A) show the location where suction cups and where the suction cups will attach on the wall outlet cover plate, shown in FIG. (10B), may be used to adhere to an outlet cover plate and support the extra weight of the combined DV device and lighting fixture when directly plugged into a wall outlet. FIGS. (11A and 11B) show alternative DV or camera devices arranged, according to the principles of the invention, to be plugged into a wall outlet and to be supported, as necessary, by additional suction cups.

FIG. 12-A, 12-B, 12-C, 12-D, 12-E, show the separate motion or moving detector(s) sensor unit has built-in digital data device at least has camera(s), digital data storage kits, memory card, SD card, Micro SD card, IR motion module, USB set to download or deliver digital data, Bluetooth Module, Wireless Module, control module, photo sensor module, circuit and conductive wires, wireless communication set, wifi, 3G/4G/or incoming 5G network even for settle lite channel's connection kits, controller, circuit so can put the individual separated motion/moving sensor unit has built-in camera(s) to the best location for wider detect angle, hidden location to protect people home, residence, office, small business.

The said separated motion sensor unit has built-in camera(s) has (A) optional IR night vision optics kits to help people take the photos under low or no brightness environment for recognizable image or (B) all kind of the Light source so can offer the brighter lights to take photos or video under lower or no-brightness environment for black-n-white or the colorful and nice image.

From FIG. 12-A show the separate motion sensor unit (100) while use to assembly into (current inventions) light-device has every preferred camera relate function except the motion sensor trigger, or to assembly into (out-of-date) light device which just only has one light function.

From FIG. 12-A the separated motion or moving sensor unit which has wired or connected with the said main security light set which has everything just has no motion/moving sensor unit and the separated unit powered by conductive wires (110) which can within or inner of the install kits or adjustable kits such as tube, hose, retractable bar, empty linear tube or the others, and the said tube, hose, retractable arms, empty linear tube has the assembly design to allow the separated motion sensor unit to fit into light device.

The separated motion/moving sensor unit to fit into said Light device has 2 type;
(AAA) One if for current invention has everything but no motion/moving sensor as trigger or switch and the separated motion/moving sensor unit is not built-together with other parts of main light device, or
(BBB) the separated motion/moving sensor unit is to install to out-of-date light device which just only has light for illumination so can upgrade just only light source light device can upgrade to has camera and part or all current invention's functions.

This is very important because the separated unit only act as switch to turn on the main light device or main LED light device's all preferred part or all functions. The said separated unit on this FIG. 12A without any parts or all camera or digital data related functions except the motion or moving sensor as switch to turn on the main light device which has every pre-determined part or all camera related function as above discussed is the model (AA).

The one of the alternative (BB) model is separated motion/moving sensor unit has all functions just has no light source so can use this (BB) alternative model to fit into all market out-of-date light device which only had light source for illumination and without any (1) camera for MP4 format digital data, (2) memory assembly, (3) download USB ports or use other download device (4) wifi, (5) wireless transmitter or receiver, (6) connect to 3G/4G/incoming 5G network or settle-lite channel system, (7) connect to phone or communication equipment capability or funtions.

So this (BB) Alternative separated motion/moving sensor unit replace old one simple motion sensor and assembly by the said universal install kits which has adjustable kits/functions to make all out-of-date simple light device up to light device has built-in camera with low-cost or middle cost or high-end cost models.

The separate motion sensor unit (100) has at least one of the built-in camera(s) which has its preferred functions and the motion sensor (101) or moving detector(s) sensor fit within the separate motion sensor unit housing (100) or under the proper locations.

From FIG. 12-B show the separated motion sensor unit (100) while use to work alone without working with other light source that has screw-in or plug-in or twist-n-lock male end for example like market existing male lamp base to fit into the female lamp socket or lamp holder to connect with the power source which has built-in camera (102) and built-in wireless communication assembly and related hidden antenna (103) and related electric circuit module (shown on FIG. 12-E) to allow the separate motion sensor unit (100) can has camera to take digital data (which has at least of image or-and sound has minimum MP4 or higher rank data), or-and save into removable memory card or connect to cloud data storage station, or-and download by USB wires kits or send out by wireless system such as Wifi or 3G/4G/or incoming 5G network or deliver by settle-lite channels of the digital data to preferred receiving ends which can connect with 3G/4G/incoming 5G network or catch settle-lite channel device such as mobile phone can connect with 3G/4G/incoming 5G network.

The separated unit also has light source or other wireless communication equipment so can also communicate with desired computer, wireless receiving ends or equipment(s).

While the said separated unit powered by female lamp holder, lamp base, lamp socket because the home lighting may not turn on at the night time, so the separated motion sensor unit has built-in back up rechargeable battery or energy storage device, so camera and light source will not lose power during the female lamp holder has no power. So (1) The lamp-base type of separated motion sensor unit has to has backup battery or energy storage device to supply sufficient and non-power shutdown power to the separated motion sensor unit to continue work while female lamp holder no power while people turn off the lamp holder power or power failure time (2) The lamp-base type of motion sensor unit has to have the IR night vision module or built-in LED light source(s) to help the built-in camera can still take a clear photos while the power fail or female lamp-base power off. This is 2 important issue and features for current invention for the male lamp-base type of separate motion sensor unit has built-in Camera install alone and fit within the female lamp base, lamp socket, lamp holder.

From FIG. 12-B, The AC or DC power from the female lamp-holder or lamp-socket or male lamp-base which has AC or DC current which use for home, office, residence. The separate motion sensor unit has at least one camera or multiple cameras (102) has the male lamp-base (109-1) to connect with the female lamp-base or lamp-holder or lamp-socket, so the AC or DC electricity to drive the separate motion sensor unit but while the lamp holder power is shut down or power failure time, the power will use the backup energy storage device such as rechargeable batteries or the other energy device to supply sufficient power to the said male lamp-base separate motion sensor.

It also has the IR night vision for this power fail or power off time period to allow the camera kits to take photos. This is special design by current invention and cover for the current invention for separated motion sensor unit application.

The current invention if all power is come from the male lamp-base into the said light fixture, LED bulb, Lamp holder, flashlight, entrance door light, garden light, floor light, outdoor or indoor application as above discussed example, all items for power failure or power shut-down need to have the a. Backup energy storage device to supply power b. IR night vision to help to take a clear photos or video.

From FIG. 12-C shown the separate motion sensor unit (100) has the wireless communication antenna (107) on outside housing area to get the best wireless communication capability than the FIG. 12-B hidden antenna.

Also, the show the motion/moving sensor (101), camera (102), Memory card in a SD or Micro SC card or other market available memory kit's slot (108) and the separated motion sensor unit power by the conductive wires (110) has the installation kits or adjustable kits (105) to help the said separate motion sensor unit can well installation on any desired location(s) of current invention light device or replace all non-camera light device for part or all the current invention discuss for camera related functions similar with the FIG. 12A discussion but with pole antenna to get best signal from wireless system.

From FIG. 12-D show the separated motion sensor unit (100) has the plug-in prong to supply the power. The prong may retractable so can easily carry to anywhere. The wireless communication antenna (107) also can quickly take apart and re-assembly while traveling or packing to reduce the packing size. The separate motion sensor unit (100) has the desired circuit combinations so can get different or part or all functions as current invention discussed on above text or also can make model as market required and cost consideration such as The low-cost model will be
only the PIR motion or moving detector sensor (111),
The middle-cost model,
PIR motion or moving detectors sensor (111)
+Blue tooth module or USB download wires sets (112),
The higher-cost:
PIR motion/moving detector sensor (111)
+Blue tooth module or USB download wires sets (112)
+wireless communication assembly or wifi (113),
The Delux model: for more higher grade will be
PIR motion/moving detector sensor (111)
+Blue tooth module or USB download wires sets (112)
+Wireless communication assembly or wifi or cloud connection or APP (113)
+Multiple-ways communication including a speaker (not shown)
  so can talk with the people or alive objects with sound for people or alive object stay at camera location.
  These level for cost and functions is for example not limited and details for part or all function of all above discussed, it is appreciated any alternative or equal function or equivalent or replaceable of all current invention or co-pending filing or issued parent patents discussed, mentioned should still fall within current invention scope and claim coverage.
From FIG. 12-E show the one of embodiment detail construction for the said separated motion/moving sensor unit (100) which has front case (120) which has openings (120-1) to install the motion or moving detectors sensor head and photo sensor head (123) (123-1) on the PIR/detectors module (122) also has 2nd openings (120-2 on bottom location) to install the Camera head which on the camera module (124) with its camera lens or lens assembly (125) and for upgrade model can has the Blue-tooth/USB download set, and/or wireless communication module (126) depend on the market required for part of all above discussed functions and more higher grade motion sensor specification and functions including wifi, APP, Cloud, 3G/4G/5G network, settle-lite channel connection system or assembly.
The Back case has several screw or fasten kits to assembly the front case and back case together. The inner housing has adjust kits or join kits (127) connect with the outside adjust or join kits (127') to make the separate motion sensor unit can install, adjust angle, position, orientation on anywhere preferred. The inner empty space of the adjust or join kits (127) (127') allow the electric wires to connect with circuit and power source. The wireless antenna (129) can tread-into the inner holder (not shown) to make quickly install and take-apart and re-assembly for wireless communication models. This preferred embodiment teach the said separated motion sensor unit has multiple of the circuit and modules which each of the circuit or module has its own functions which may including (a) Motion/moving detectors sensor and photos sensor module (b) Bluetooth module or USB port with data delivery sets (c) wireless communication module (d) Memory card or connect system to cloud storage station module (e) sound module (f) recorder sound module for capture sound (g) camera module for visible capture functions has minimum MP4 Format digital data (h) SIM card or slot device (i) Wireless communication system including wifi, 3G/4G/5G network or settle-lite channel communication or transmitting or receiving system (j) backup batteries or power storage device for power fail time do not stop working, and has desired electric parts & accessories & IC chip to help all these different or part or all functions modules, circuit to present the pre-determined function, performance, effects. The electric parts & accessories may has desired combination or at least one selected from Motion/moving detectors sensor, photo sensor, speaker, memory storage device, camera device, video capture device, sound capture device, Bluetooth device or USB port for data delivery, wireless communication device, sim card (for wireless communication to send out phone, email, alert, message though the internet, wireless network though market available internet or telecommunication system available from market place), conductive wire, prongs, backup battery (for power fail time for backup power source), From FIG. 12-F, 12-G, 12-H, 12-I show the AC or DC powered by wired or plug-in Model for motion/moving detectors sensor security light which has Par38 or Par30 or other preferred light source (L1) or LED light source (L2) to offer the super bright light beam while the motion or heat been detected by motion sensor (M1) which are install on the base (B1) with adjustable frame or arms or join-piece (F1) so can adjust the angle, position, orientation of the said camera (C1) of the said digital data device will take photos or video at the same time and get super bright light beam help at the dark environment to take a colorful photos or video and storage inside memory storage device such preferred SD or MicroSD card.

The FIG. 12-F, 12-G, 12-H, 12-I show the motion sensor (M1) is install on the base (B1) which is current invention's separated motion sensor has built-in camera which has adjustable frame or arms or join-piece (F1) so can make easily install, add-on, take-apart, re-assembly for all the market available non-camera security light so can replace the non-camera motion sensor to the current invention's built-in camera motion sensor and use the same adjustable frame or arms or join-piece (F1) to make this upgrade from Non-camera security light become to built-in camera motion sensor security light instantly. The market available non-camera security light has limited type of base and frame, arms, join-piece so it is very simple to make universal kits to make the replace or upgrade from non-camera motion sensor unit to the built-in camera motion sensor module. Some time, the camera kits also can has its own housing if required so can make the camera-module also put on the separate unit for special customer-made application is not limited for current invention for security light or more wide as parent filing U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

From FIG. 12-I and FIG. 12-K show the power is from DC power source which is solar (Solar 1) (Solar 2) or the inner backup batteries (see FIG. 12-E (126-1) shown for power fail time use). From FIG. 12-J can see the solar power module (Solar-2) which can use wired or wireless to offer the power to the said separate built-in camera (C1) motion sensor (M1) and detected the moving or heat of the motion items and use the inner wireless communication assembly and kits to transmit the electric signal to the light device (L2) here is preferred is LED light source and/or send the wireless communication digital data though the inner SIM-Card and though market available internet or wifi or telecommunication channels to send digital data such as email, message, data, image, sound, alarm to people's mobile phone, computer, security system, police station to know the house, residence, office, business area's situation further more can electric wireless multiple-ways communication talk and send out all video or audio data to all parties which more than 2 ways wireless communication or send out pre-determined signals to other device to do pre-determined works, functions.

FIG. 12-F, 12-G, 12-H, 12-I, 124, 12-K, show some current invention's preferred models to upgrade the current market available non-camera motion sensor security which has different light source, construction, number of light units, shape, brightness, sensor range, sensor distance has built-in Motion sensor or separate motion sensor, or separated wireless motion sensor unit, has IR night vision or without the IR night vision. All these preferred embodiments for FIG. 12-F, 12-G, 12-H, 12-I, 124, 12-K are some of preferred embodiment for the whole sets of the motion security light but not limited to these embodiments.

From FIG. 12-K show some of market available styles of the Motion Sensor security light has current invention's built-in Separated motion sensor with light source unit, base, or current invention's discrete and separate motion sensor is separated with light source kits or light source base and sold by itself without the light source kits together.

The current invention for above FIG. 12-A to 12-K drawing and detail description is not a new issues basing on the Parent filing which cover all the lighting device as parent filing details listed on U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

FIG. 13 show the Multiple functions for current invention for any combination. The all features for each electric parts or accessories has details discuss on above but not limited for limited text inside this filing. It is appreciated that all the co-pending filing, patented parent, current invention all claims or disclosure should be fall within the current claims coverage. The flow charter may has different text, Please check the current invention for all same function, equal function, replaceable, alternative words to back up all any confusing words shown on flow charter list.

FIG. 14 show the preferred the one of the PIR head with Digital not analog so can prevent from false triggers In summary, the invention provides a light device having a built-in digital data device powered by an AC unlimited power source that supplies unlimited power to the device or DC big capacity of electricity to supplies sufficient power to device, the digital data device including at least one camera having means for capturing images, data, or sound at a desired shooting angle, resolution, color, brightness, and sharpness, and at least one of means for storing the images, data, or sound into a memory and means for transmitting the images, data, or sound to at least one of a communication device, computer device, phone, receiver device, and display device, the digital data device further including at least one of components selected from lenses, optical components, electrical components, mechanical components, circuitry, an integrated circuit (IC), data delivery means, data storage means, a USB port, a cable, a microphone, record means, display means, sensor means, PIR means, IR means, night vision means, flash means, a switch means, motion detect means, sound detect means, a photo sensor, a motor, and tracking means. The light device includes a housing and means for emitting light beams, and is supplied with power from the power source by circuitry including at least one of a controller, switch, sensor, conductors, integrated circuit, remote controller, and wireless communication means, The light device may be selected from a night light, desk lamp, floor lamp, down light, ceiling light, track light, security light, projection light, flashlight, outdoor light, indoor light, LED light fixture, LED light bar, LED picture light, LED Closet light, LED door light, LED garage light, The light device including LED motion sensor light, LED power failure light, LED light with auto tracking, LED patio light, and LED light device, and may be connected with the power source by prongs, a conductive wire with a plug extending from the light device, a USB adaptor, a transformer device, and an inductor device.

In a preferred embodiment, as illustrated in FIGS. 1A-1C and 2A-2B, the device is in the form of an insert forming a lamp holder with a socket having desired lamp socket specifications, said insert being arranged to be inserted into an existing light fixture.

Preferably, the light device may have multiple function in addition to a lighting function including portable or hand-carry flashlight or others, and may include a compartment for extendably, retractably, foldably, or transformably installing accessories that provide more than one function.

The light device's digital data means include sensor means having more than one sensor head and an integrated circuit for controlling an auto tracking assembly that enables the camera to track moving objects or persons, and/or may include multiple cameras for capturing images of different locations.

The light device's unlimited AC power source may be an electrical utility power supply system for supplying electricity to homes, residences, and businesses.

The invention for Light device also provides a webcam having an auto tracking means and power supply connected to an unlimited power source to a USB interface, the webcam including at least one camera head having means for capturing images, data, or sound at a desired shooting angle, resolution, color, brightness, and sharpness, a motor, and sensor means for causing the move the camera head to follow a moving object or person, and means for storing or transmitting data captured by the camera head to one of a display, computer, communication device, phone, Internet, website, e-mail, or auto dialing system. The webcam may include a USB adaptor for connection to a computer or communication equipment with a USB port, with the webcam being activated when connected with the power source to carry out predetermined image capture functions and to capture digital data under predetermined environmental conditions.

The Light device's webcam may include suction cups for mounting the webcam to a computer screen or housing, and multiple camera heads for simultaneously viewing multiple areas, as well as a lighting device or devices having additional functions.

The light device's webcam preferably further includes prong means for directly plugging the webcam into an electrical outlet, and weight supporting means for supporting the webcam on the outlet, said weight supporting means including at least one of the following: at least one suction cup, glue, double-sided tape, a hook and loop fastener, an adhesive, a chemical compound, a connector, an adaptor, and a fitting means, and may be arranged to operate at night or in low light.

I claim:

1. A LED light having a built-in camera including digital data device consist of: said LED light has preferred LED light source(s) and at least one of motion sensor including PIR detector, or moving detectors with comparison functions, wherein: said digital data device includes: at least one camera having function(s) for capturing images, data, or sound at a desired shooting angle, distance, resolution, color, brightness, and sharpness in MP4 or more high speed format to take photos or video for pre-determined time, period of time for certain times, and at least one storing kits or station for storing the said images, data, or sound into a memory or storage kits or cloud storage station for (1) an USB set or electric device or wireless set to download, or/and (2) a delivery-tool to deliver the said images, data, or sound by connection system or transmitter to at least one of a communication device, computer device, phone, receiver device, display device; or for display or replay or reply or answer of the images, data, or sound by the digital data device itself; said light device includes a housing and function(s) for emitting visible LED light beams offer sufficient brightness to camera unit to take colorful photo(s) or video(s) into MP4 format digital data with sound and other data under the dark environment, said LED light device has AC-to-DC circuit to operate the DC LED light source, and optional circuitry including at least one of a controller, switch, motion or moving or photo or other sensor, conductors, integrated circuit (IC), remote controller, and wireless connect system, communication assembly and the said LED light having desired combination functions select from: (1) MP4 of higher rank digital data is storage into memory kit or card, or save into cloud storage station, and download to display, replay, reply; (2) or digital data can use electric device or Bluetooth or USB set by wire or wireless tool(s) to download and displayer, replay or reply; (3) or digital data delivery by wifi or desired wireless connect system through wireless network, 3G or 4G or update wireless network, router, server(s) to operate message, data, alert, words, and preferred to incorporate with apps, other programed-software to deliver by emails, line, skype, WhatsApp, or update platform(s) software to variety of communication or computer or consumer electric products which can connect with 3G/4G/incoming 5G connection system including mobile phone, computer, monitor; (4) or LED light device have multiple-ways communication assembly to talk and hear and review by microphone or-and speaker through wifi and wireless network, 3G or 4G or update wireless network, router, server; (5) or LED light device while incorporate with related program(s) software can remote control camera angle, position, orientation and talking though LED light device; (6) or LED light has motion/moving sensor unit or module which only has motion/moving/or brightness sensor act as switch just to turn on or turn off all LED lighting or-and camera or-and digital data function(s) which motion/ moving/brightness sensor can be (a) install with camera or separated with camera, or (b) install module inside of LED light wall mounted base without its own housing, or install unit outside of LED light wall mounted base has its own housing and assembly with LED light base; (7) or LED light has motion/moving sensor unit which has separated own housing not install inside LED light wall mounted base, and (1) at least has built-in camera and memory kits or-and (2) has parts or all of digital data operation including (a) USB download set or wireless transmitter or receiver for download work, (b) communication to wireless wifi, 3G/4G/ incoming 5G network, cloud storage station, APP or other programed software (c) deliver digital data to display, phone, computer, displayer, monitor functions or operation (d) operate for other selected or added functions by related electric or mechanical parts and accessories so can fit the said separated housing motion/moving sensor unit to non-camera LED light device to upgrade and increase value and functions, said LED light device is connected with the power source by one or combination of (a) prongs, (b) conductive wire, (C) a conductive wire with a plug extending from the light device, (d) a USB adaptor, (e) a transformer device, (f) a power fail backup power storage device (g) an inductor device for wireless charging inner power kits.

2. A LED light as claim in claim 1, where said LED light source and camera or DV is triggered by the motion or moving detector(s) sensor and light brightness sensor AT THE SAME TIME under the dark environment.

3. A LED light as claimed in claim 1, wherein said LED light is a LED bulb or Lamp holder includes an insert male-base arranged to be inserted into an existing light fixture or lamp-base female receiving end or socket or terminals.

4. A LED light as claimed in claim 1, wherein said light device is one LED lighting fixtures has at least one non-lighting function in addition to a lighting function.

5. A LED light as claim 1, the said LED light device LED flasher light or LED strobe light which offer the sufficient light brightness good for take color photo and not big power consumption like plurality of night vision diode(s).

6. A LED light as claimed in claim 1, wherein the light device has extendable, retractable, foldable, or transformable body, housing, or parts with accessories that provide at least one non-lighting function and can use (1) wireless communication to make setting or adjustment, or
  (2) multiple-sides communications, control, conversation, adjust angle, focus, brightness, signal, or
  (3) other functions control by wireless technical including hardware or software including APP or other update software incorporated with wife, 3G, 4G or future connection system or-and cloud storage station(s).

7. A LED light as claimed in claim 1, wherein said moving sensor having more than one moving sensor head(s) and integrated circuit (IC) to detected and compare the status of moving objects.

8. A LED light as claimed in claim 1, wherein said device includes multiple cameras for capturing images of different locations.

9. A LED light claimed in claim 1, wherein said individual or separated motion or moving sensor unit includes; (a) Sensor unit has cameras for capturing images and desired digital data has MP4 or higher rank digital data; and (b) sensor unit(s) can get power by conductive male-base or conductive wires from (1) existing female bulb socket for AC or DC power, or (2) built-in power fail or power-off backup DC batteries power, or (3) prong which insert into the outlet of wall or extension cord.

10. A LED light as claimed in claim 1, wherein said AC power source is an electrical utility power supply system for supplying electricity to homes, residences, and businesses.

11. A LED light as claimed in claim 1, wherein said DC power source is an electrical solar power supply system has built-inside energy storage device including batteries or rechargeable battery, capacitors, or battery, or DC power from any AC-to-DC electric device including transformer, inverter, adaptors.

12. A LED light as claimed in claim 1, wherein said separated motion or moving sensor unit has built-in digital data device not install with the LED light wall mounted base or assembled with LED light; and
  separate unit connect with power source has at least one or preferred combination parts and function(s);
  (1) camera for MP4 or higher technical format data, or-and
  (2) memory storage kits, SD card, Micro SD card, or cloud storage station, or-and
  (3) circuit, conductive wire or base, or-and
  (4) communication assembly to download, save, play or-and
  (5) wireless transmit through preferred wife, or 3G/4G/ incoming 5G or more high technical network incorporated selected APP software for the data to communication device, computer, mobile phone, consumer electric products, laptop computer.

13. A LED light as claimed in claim 1, wherein said separated motion or moving sensor unit has built-in digital data device can fit with market existing security light which has non-camera related functions so can sell individually to consumer to upgrade non-camera security light.

14. A LED light as claimed in claim 1, wherein said separated motion sensor unit has built-in digital data device fit with market existing non-camera security light can use
  (1) conductive wire,
  (2) inductive or wireless assembly
  to get, deliver or transmit the electric signal(s) or power or data to said light source set for pre-determined function(s), performance(s), light effect(s) or multiple-way communications.

15. A LED light as claimed in claim 1, wherein said motion or moving sensor unit has built-in digital data device is a single unit not install on light device wall mount base or assembled to LED light housing has conductive wire, adaptor, plug, quickly wiring kits or wireless communication kits to connect with LED light for power, and sell individually to work with any other light source assembly.

16. A LED light as claimed in claim 1, wherein said discrete housing of the motion sensor unit has built-in camera(s) can connect or assembly or join with the said light device by accessories selected from Frame, Installation plate, substrate by screws, nail, hooks, glue or market available installation kits.

17. A individual motion or moving sensor unit having a built-in data device consisting of: said motion or moving sensor unit trigger its built-in light device which has preferred light source selected from Bulb, PAR38, CFL or LED while motion or moving sensor(s) detected the moving objects, wherein said digital data device includes at least one camera having function(s) for capturing images, data, or sound at a desired shooting angle, distance, resolution, color, brightness, and sharpness in MP4 or higher technical format, and at least one storing assembly for storing the images, data, or sound into a memory or storage unit including cloud storage station for download or transmission of the images, data, or sound, or-and at least one of connection system or transmitter through wifi or-and 3G/4G/incoming 5G or more high technical network to at least one of (1) a communication device, computer device, phone, receiver device, and display device, 2) or for display or replay or reply or answer of the images, data, or sound by the digital data device itself; said separated unit's light device has function(s) for emitting visible light beams while motion or moving sensor unit(s) be trigger by moving subjects to supply sufficient brightness to camera or DV for pre-determined time, a period of time to get colorful digital data; said unit has circuitry including at least one of a controller, switch, variety other sensor, brightness sensor, conductors, integrated circuit(IC), remote controller, and wireless connection system for operation different light source light device; and said separate motion sensor unit has built-in Camera is at least one or combination of (a) a DC or/and AC powered device, and/or (b) an AC-powered wired device, and/or (c) a screw-in male base into female receiving socket or a plug-in prong into outlet device having at least one of additional functions than camera function select from: (1) digital data storage into memory card or cloud storage station which can display, replay, reply, or/and (2) digital data can download into communication device(s) by wired or-and wireless connection system or other electric device for displayer or replay or reply, or-and (3) digital data can use wired or-and wireless communication assembly or system through wifi or 3G/4G or incoming 5G network or-and with preferred APP or other software to send out message, sound, image, data, alert, words by emails, line, skype, what's APP, twitter, Instagram, or update software or platforms to variety of communication device which can work for 3G/4G or incoming 5G network products including mobile phone, computer, monitor, or/and (4) digital data have multiple-ways communication though wireless network or update wireless network, wifi, router, server through 3G/4G/5 network or-and optional preferred software including all kind of APP to communicate with the said motion sensor unit has built-in camera while incorporate with related software so can remote control camera angle, position, orientation and talking though motion sensor unit; wherein the separate motion sensor unit has built-in camera has more than one functions, and said separate motion sensor device is connected with the AC and/or DC power by one of (aa) prongs, (bb) male-base into female-socket, (bb) conductive wire, (cc) a conductive wire with a plug extending from the light device, (dd) a USB port and USB plug with wire, (ee) a AC-to-DC device including transformer, invertor, adaptor, (ff) inductor device for wireless charging inner power kits; said individual motion or moving sensor unit including digital data device has its own housing to arranged parts of accessories fit within housing, and parts and accessories including at least one or combination set of camera, storage kits, SD or micro-SD card and slot(s), memory storage kits, SIM card, cloud storage station connection kits, wireless connection system, communication assembly; wherein said individual housing motion or moving sensor unit which has its own power system, and unit (1) can sell individual for plug-in, or screw-in, or AC plug with wire, or-and (2) assembled with non-camera lighting device by wired and assembly kit.

18. A individual motion or moving sensor unit has built-in digital data device as claim 15, the said sensor unit has light device which can be any type including LED flasher light or other light source strobe light which offer the sufficient light brightness good for take color photo and not big power consumption like plurality of night vision diode(s).

19. A individual motion or moving sensor unit has built-in digital data device as claim 15, the said sensor unit has variety light device to help to take clear photos or video while power failure or power off, and the power is coming from the unit's backup DC power source including batteries, or rechargeable batteries.

20. A individual motion or moving sensor unit has built-in digital data device as claim 15, the said DC power including the power fail backup batteries or rechargeable batteries or energy storage device to offer the power while power off or power failure time.

21. A LED light has built-in camera can operate digital data consist of: at least one of motion/moving sensor unit has its own housing separated with main LED light device wall mounted base, the said separated housing sensor unit only act as switch to turn on or turn off (1) all LED lighting and camera and related digital data function, the said unit is assembly with LED light device mounted base by assembly set, joint set, screw-sets with adjustable arms or bar or tube or rotatable kit or adjustable kits.

22. A motion or moving sensor has built-in camera can operate digital data consisting of: at least has one of motion/moving sensor unit which has individual housing, and at least one of built-in camera take at least MP4 format digital data and storage digital data device, or-and has parts or all of digital data function(s) including: (a) USB download set or wireless transmitter or receiver for download work, b) communication to wireless wifi, 3G/4G/incoming 5G network, cloud storage station, APP or other programed software, (c) deliver digital data to device can receiver 3G/4G/incoming 5G or higher rank network's including phone, computer, displayer, monitor functions or operation, (d) operate for other selected or added functions by related digital data software, electric or mechanical parts and accessories, the said individual motion/moving sensor unit assemble to non-camera LED light device to upgrade and increase value and functions.

23. A LED light device having a moving/moving sensor including a built-in camera that can operate digital data consisting of: at least has one of motion/moving sensor unit install on LED light to turn on and turn off light and camera to active under predetermined time, period of time, functions to get colorful image and sound or digital data, and the said camera take at least MP4 format digital data and storage digital data device by memory kits or connect to cloud storage station, or-and has parts or all of digital data function(s) including: (a) USB download set or wireless transmitter or receiver for download work, (b) communication to wireless wifi, 3G/4G/incoming 50 network, cloud storage station, APP or other programed software, (c) deliver digital data to device can receiver 3G/4G/incoming 5G or higher rank network's including phone, computer, displayer, monitor functions or operation, (d) operate or make adjustment or control other selected or added functions by related digital data software, electric or mechanical parts and accessories, the said motion/moving sensor unit (1) can inside the LED light device wall mounted base, or said unit (2) can assembled with LED device wall mounted base by assembly kits, joint kits, adaptor kits through screw-in, fit-tight, catheter, push-tight, plug-in, by arms, bars, pole, tube has channels to allow wires connect to power.

* * * * *